United States Patent
Lee et al.

(10) Patent No.: US 9,338,738 B2
(45) Date of Patent: May 10, 2016

(54) SYSTEM, DEVICE AND METHOD FOR PROVIDING SIMULTANEOUS DATA TRANSMISSION SERVICE BASED ON HETEROGENEOUS NETWORKS

(71) Applicant: SK TELECOM CO., LTD., Seoul (KR)

(72) Inventors: Gyu Min Lee, Yongin-si (KR); Jeong Su Kim, Seongnam-si (KR); In Jang Jeong, Seoul (KR); Kyung Hoon Kim, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 384 days.

(21) Appl. No.: 13/925,259

(22) Filed: Jun. 24, 2013

(65) Prior Publication Data

US 2013/0286941 A1   Oct. 31, 2013

Related U.S. Application Data

(63) Continuation of application No. PCT/KR2012/004030, filed on May 22, 2012.

(30) Foreign Application Priority Data

Jun. 3, 2011   (KR) .......................... 10-2011-0054096
Jul. 19, 2011   (KR) .......................... 10-2011-0071597

(51) Int. Cl.
*H04W 48/18*   (2009.01)
*H04W 28/06*   (2009.01)
*H04W 28/22*   (2009.01)

(52) U.S. Cl.
CPC ............ *H04W 48/18* (2013.01); *H04W 28/065* (2013.01); *H04W 28/06* (2013.01); *H04W 28/22* (2013.01)

(58) Field of Classification Search
CPC ... H04W 48/18; H04W 28/065; H04W 28/06; H04W 28/22
See application file for complete search history.

(56) References Cited

U.S. PATENT DOCUMENTS

2004/0228278 A1 * 11/2004 Bruckman .............. H04L 47/10
                                                              370/231
2008/0137568 A1   6/2008 Ho et al.

FOREIGN PATENT DOCUMENTS

JP        2003037636    2/2003
KR   1020070008572    1/2007
(Continued)

OTHER PUBLICATIONS

Korean Office Action dated Jun. 20, 2012 for Application 10-2011-0054096.

(Continued)

Primary Examiner — Kwang B Yao
Assistant Examiner — Adam Duda
(74) Attorney, Agent, or Firm — Hauptman Ham, LLP

(57) ABSTRACT

Disclosed are a heterogeneous network based-simultaneous data transmission service system and method which include a transmission device for dividing data into two or more partial data, selecting first partial data corresponding to a part of the two or more partial data, and selecting second partial data corresponding to another part of the two or more partial data; a first network device for receiving the first partial data from the transmission device; a second network device for receiving the second partial data from the transmission device; and a reception device for receiving the first partial data from the first network device, receiving the second partial data from the second network device, and reconstituting the data by combining the first partial data and the second partial data.

19 Claims, 18 Drawing Sheets

(56) References Cited

FOREIGN PATENT DOCUMENTS

| KR | 1020070041096 | | 4/2007 |
|----|---------------|---|--------|
| KR | 1020080058382 | | 6/2008 |
| KR | 1020090081639 | A | 7/2009 |
| KR | 1020110016749 | | 2/2011 |

OTHER PUBLICATIONS

International Search Report mailed Nov. 28, 2012 for PCT/KR2012/004030.

\* cited by examiner

Fig. 2

| IMSI | 3G IP | WiFi IP | Routing Rule | |
|---|---|---|---|---|
| | | | Source IP, Port | Policy |
| 45005 11111 11111 | 192.1.1..1 | 10.10.10.1 | Origination IP : 211.115.10.1, Origination Port : 8000 | WiFi 100% |
| 45005 11111 11111 | 192.1.1..1 | 10.10.10.1 | Origination IP : 203.236.33.124 , Origination Port : 8001 | 3G 100% |
| 45005 11111 11111 | 192.1.1..1 | 10.10.10.1 | Origination IP : 203.236.33.126 Origination Port : 8002 | WiFi 50% 3G 50% |

Fig. 3

| Key | IP | BID | Flow ID | Flow Info | Ratio |
|---|---|---|---|---|---|
| Key1 | 3g ip1 | Id1 | fid1 | s_add1,s_port1,dest_addr1, dest_port1, tcp | 60 |
| Key1 | Wifi ip1 | Id2 | fid1 | s_add1,s_port1,dest_addr1, dest_port1, tcp | 40 |

SYSTEM, DEVICE AND METHOD FOR PROVIDING SIMULTANEOUS DATA TRANSMISSION SERVICE BASED ON HETEROGENEOUS NETWORKS

CROSS-REFERENCE TO RELATED APPLICATION

The present application is a continuation of International Application No. PCT/KR2012/004030 filed on May 22, 2012, which is based on, and claims priorities from, KR Application Serial Number 10-2011-0054096, filed on Jun. 3, 2011 and KR Application Serial Number 10-2011-0071597, filed on Jul. 19, 2011. The disclosures of the above-listed applications are hereby incorporated by reference herein in their entirety.

FIELD

The present disclosure relates to a system and a method for providing a heterogeneous network based-simultaneous data transmission service, a transmission device and an method for operating the transmission device, and a reception device and an method for operating the reception device.

BACKGROUND

The statements in this section merely provide background information related to the present disclosure and may not constitute prior art.

Recently, a service provider simultaneously provides services based on a plurality of wireless technologies in many cases. Main domestic service providers have introduced WCDMA, CDMA, WiBro, and a WLAN (WiFi) technology corresponding to a wireless local area network to construct and service a network. Further, currently, a Long Term Evolution (LTE) network is actively introduced.

The inventor(s) have experienced that in a heterogeneous network environment where various networks coexist, a current method in which a terminal device uses a data service through the heterogeneous networks may correspond to a passive method in that the method is an access network selection method by a direct change by a terminal device user which excludes a service provider's controllability when a service provider side is considered.

Meanwhile, at present, as various wireless devices such as a smart phone, a tablet PC and the like increase, a data service charge decreases, and various large-capacity data services increase, a network load rate of the service provider rapidly increases, and thus network investment costs are excessively spent and service stability is threatened.

Accordingly, the inventor(s) have noted that a new service scheme of actively selecting an access network of the terminal device according to a network status in the heterogeneous network environment where various networks coexist and efficiently transmitting data by using the selected network is required.

SUMMARY

In accordance with some embodiments, in the heterogeneous network based-simultaneous data transmission service system, a transmission device comprises a controller, a first communication unit and a second communication unit. The controller is configured to divide data into two or more partial data. The first communication unit configured to transmit first partial data corresponding to a part of the divided two or more partial data over a first network. And the second communication unit configured to transmit second partial data corresponding to another part of the divided two or more partial data over a second network, the first and second networks being different networks of a heterogeneous network. The controller is configured to select the first partial data from the divided two or more partial data according to a first transmission rate for data transmission to a first network device via the first communication unit, select the second partial data from the divided two or more partial data according to a second transmission rate for data transmission to a second network device via the second communication unit, determine whether at least one of the first transmission rate and the second transmission rate is changed, and when the one or more of the first transmission rate and the second transmission rate are changed as a result of the determination, (i) select the first partial data from the divided two or more partial data according to the changed first transmission rate, or (ii) select the second partial data from the divided two or more partial data according to the changed second transmission rate, or (iii) select the first partial data from the divided two or more partial data according to the changed first transmission rate and select the second partial data from the divided two or more partial data according to the changed second transmission rate.

In accordance with some embodiments, in the heterogeneous network based-simultaneous data transmission service system, a reception device comprises a first communication unit, a second communication unit, and a controller. The first communication unit is configured to receive first partial data selected from two or more partial data divided from data according to a first transmission rate for data transmission to a first network device. The second communication unit is configured to receive second partial data selected from the two or more partial data according to a second transmission rate for data transmission to a second network device. And the controller is configured to reconstitute the data by combining the received first partial data and the received second partial data. Here the first communication unit is configured to receive the first partial data transmitted via the first network device by using access information of the first network device and access information of a particular reception device included in first access information included in the first partial data. The second communication unit is configured to receive the second partial data transmitted via the second network device by using access information of the second network device and access information of a particular reception device included in second access information included in the second partial data.

In accordance with some embodiments, a non-transitory computer-readable recording medium comprises a command for executing a process. The command is configured to divide data into two or more partial data; select first partial data corresponding to a part of the divided two or more partial data and second partial data corresponding to another part of the divided two or more partial data; and provide the selected first partial data and the selected second partial data. The command for executing the step of the selecting is configured to select the first partial data from the divided two or more partial data according to a first transmission rate for data transmission to a first network device and selects the second partial data from the divided two or more partial data according to a second transmission rate for data transmission to a second network device, wherein the first and second network devices are different network devices of a heterogeneous network. The command for executing the step of the selecting is configured to determine whether at least one of the first transmission rate and the second transmission rate are changed, and when one or more of the first transmission rate and the second transmission rate are changed as a result of the determination, (i) select the first partial data from the divided two or more partial data according to the changed first transmission rate, or (ii) select the second partial data from the divided two or more partial data according to the changed second transmission rate, or (iii) select the first partial data from the divided two or more partial data according to the changed first transmission rate and selects the second partial data from the divided two or more partial data according to the changed second transmission rate.

In accordance with some embodiments, a transmission device for a simultaneous data transmission service comprises an information acquisition unit, a controller, and a communication unit. The information acquisition unit is configured to acquire a network selection policy corresponding to a current location of the transmission device. The controller is configured to divide data into two or more partial data. And the communication unit is configured to transmit the divided two or more partial data, based on information on a network device to be accessed included in the network selection policy, to the network device.

In accordance with some embodiments, in the heterogeneous network based-simultaneous data transmission service system, a policy management device comprises an information management unit, an information generation unit, and a policy provision unit. The information management unit is configured to acquire status information for each network device. The information generation unit is configured to generate information on a network device to be accessed corresponding to a current location of a transmission device based on the status information. And the policy provision unit is configured to provide a network selection policy including the information on the network device to be accessed to the transmission device to allow the transmission device to transmit two or more partial data divided from data to be transmitted based on the information on the network device to be accessed.

In accordance with some embodiments, a transmission device operates a method for providing a simultaneous data transmission service, the transmission device is configured to acquire a network selection policy corresponding to a current location of the transmission device; divide data into two or more partial data; access at least one of network devices to be accessed based on information on the network devices to be accessed included in the network selection policy; and transmit the partial data through at least one of the network devices to be accessed.

In accordance with some embodiments, a policy management device performs a method for providing a simultaneous data transmission service in heterogeneous network, the policy management device is configured to acquire status information for each network; generate information on a network device to be accessed corresponding to a current location of a transmission device based on the status information; and provide a network selection policy including the information on the network device to be accessed to the transmission device to allow the transmission device to transmit two or more partial data divided from data to be transmitted based on the information on the network device to be accessed.

BRIEF DESCRIPTION OF THE DRAWINGS

FIG. 2 is a view of a table illustrating information for each subscriber according to at least one embodiment of the present disclosure;

FIG. 3 is a view of a table illustrating another information for each subscriber according to at least one embodiment of the present disclosure;

DETAILED DESCRIPTION

Hereinafter, at least one embodiments of the present disclosure will be described with reference to the accompanying drawings.

Figure 1:
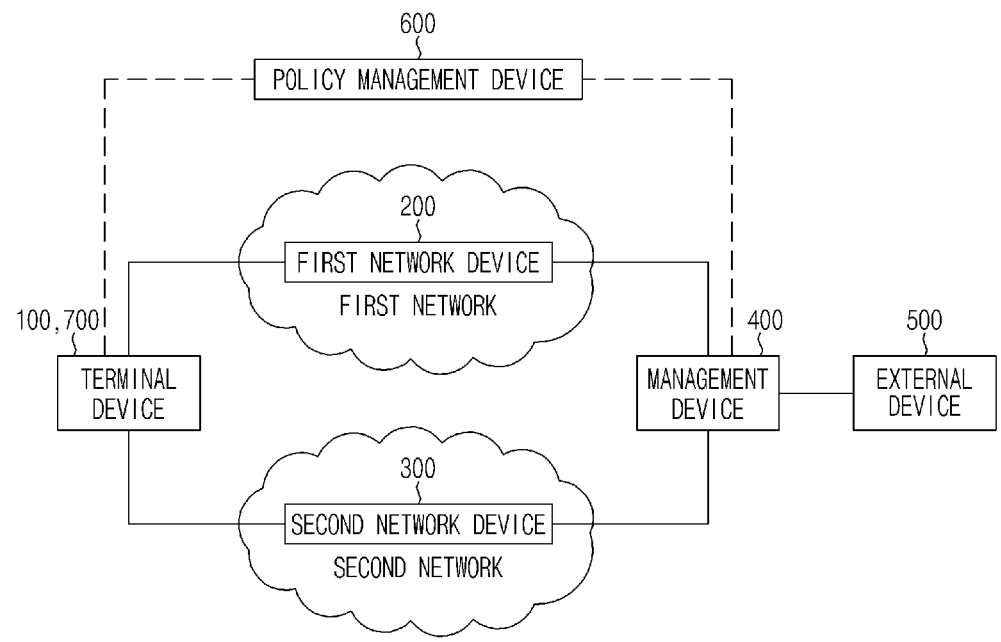
FIG. 1 is a schematic block diagram of a heterogeneous network based-simultaneous data transmission service system according to at least one embodiment of the present disclosure.

FIG. 1 is a configuration diagram schematically illustrating a heterogeneous network based-simultaneous data transmission service system according to at least one embodiment of the present disclosure.

As illustrated in FIG. 1, the system includes a terminal device 100 configured to divide data into partial data and simultaneously transmit the divided partial data through one or more networks in a heterogeneous network environment, a first network device 200 configured to receive the divided partial data from the terminal device 100, a second network device 300 configured to receive the remaining divided partial data from the terminal device 100, a management device 400 configured to combine the partial data transmitted from the first network device 200 and the second network device 300 to reconstitute (or generate) data, an external device 500 configured to receive the combined data (i.e., reconstituted data) from the management device 400, and a policy management device 600 configured to provide a network selection policy.

Here, the external device 500 refers to a server device for performing data transmission/reception with the terminal device 100 through the management device 400, and can provide various services such as a portal service, a content providing service and the like to the terminal device 100 through the data transmission/reception by the management device 400.

Further, the policy management device 600 determines a network selection policy based on various network parameters on the heterogeneous networks including, for example, a subscriber preference, a subscriber type, a subscription payment system, an application type to be serviced and the like, and network status information according to a network status change received from the terminal device 100 and the management device 400, and provides the determined network selection policy to the terminal device 100 and the management device 400.

Meanwhile, the heterogeneous networks may correspond to various access networks including, for example, WCDMA, CDMA, WiBro, WLAN (WiFi), and Long Term Evolution (LTE), but in at least one embodiment the heterogeneous networks will be exemplarily described as a first network (hereinafter, referred to as a "3G network") which refers to a wireless packet service network (WCDMA) and a second network (hereinafter, referred to as a "WiFi network") which refers to a wireless local area network for convenience of the description).

Accordingly, the first network device 200 refers to Gateway GPRS Support Node (GGSN) equipment for operating the 3G network, that is, the wireless packet service network, and the second network device 300 refers to an Access Point (AP) for operating the WiFi network, that is, the wireless local area network.

Further, the terminal device 100 and the management device 400 may be a transmission device or a reception device, in viewpoint of a service flow, that is, a subject transmitting data by using the simultaneous data transmission service, that is, an uplink process and a downlink process. In at least one embodiment, it is assumed that the terminal device 100 corresponds to a device for performing data transmission/reception located in the heterogeneous network environment and the management device 400 corresponds to a device configured to provide the simultaneous data transmission service to the terminal device 100 for convenience of the description.

First, in order to use the simultaneous data transmission service in the heterogeneous network environment, a process of acquiring access information between the terminal device 100 and the management device 400 is first performed.

In this connection, the terminal device 100 registers a location in the 3G network and accesses the first network device 200 to make a request for access information in order to acquire the access information of the management device 400 for the access to the 3G network.

Accordingly, the first network device 200 receives the access information of the management device 400 for the access to the 3G network, that is, a private IP from an address allocation device 700, for example, a DNS server according to the access information request transmitted from the terminal device 100 and transmits the received private IP to the terminal device 100.

Further, the terminal device 100 additionally makes a request for access information of the management device 400 for the access to the WiFi network to the first network device 200, and the first network device 200 having received the access information receives the access information of the management device 400 for the access to the WiFi network, that is, a virtual IP mapped into the access information of the management device 400 for the access to the 3G network, which is the private IP, from the address allocation device 700, for example, the DNS server and transmits the received virtual IP to the terminal device 100.

At this time, the management device 400 recognizes that the access information for the access to the 3G network and the access information for the access to the WiFi network are access information assigned to the same subscriber by managing the access information for the access to the 3G network and the access information for the access to the WiFi network assigned to the terminal device 100 as the same subscriber identification information (for example, IMSI).

In at least another embodiment, in connection with acquiring the access information of the management device 400 for the access to the WiFi network, the terminal device 100 can acquire the access information of the management device 400 for the access to the WiFi network from the management device 400 when making a request for the service registration through the first network device 200.

Meanwhile, as the second network device 300 located in a WiFi network area performs a Network Address Translation (NAT) function, an access address of the second network device 300 instead of access information of the initial terminal device 100 is transmitted with respect to access information of the terminal device 100 transmitted to the management device 400 through the second network device 300, and accordingly, the management device 400 recognizes in advance the access information of the second network device 300 on the WiFi network area in which the terminal device 100 is located to transmit/receive data to/from the terminal device 100 through the WiFi network.

To this end, the management device 400 acquires the access information of the second network device 300 included in the service registration request received from the terminal device 100 during the service registration process of the initial terminal device 100 through the WiFi network to store and manage the corresponding access information.

In other words, after acquiring the access information of the management device 400 for the access to the WiFi network through the 3G network, the terminal device 100 accesses the management device 400 through the second network device 300 based on the initially acquired access information to make a request for the service registration. In such a process, the management device 400 acquires WiFi network pass information included in the service registration request, that is, the access address of the second network device 300 and maps the access information of the terminal device 100 and the access address of the second network device 300 included in the corresponding service registration request to manage the mapped access information and access address as one access information.

Next, when the process of acquiring the access information of the management device 400 is completed, the service registration process between the terminal device 100 and the management device 400 is performed.

In this connection, the terminal device 100 is configured to access the management device 400 through each of the networks based on the acquired access information for the access to the 3G network and the acquired access information for the access to the WiFi network to make a request for the service registration.

The management device 400 performs the service registration of the terminal device 100 by identifying additional information included in the service registration request received from the terminal device 100 through the 3G network and the WiFi network, for example, subscriber identification information (for example, IMSI), access information, and service classification information (initial, update, and remove).

At this time, as illustrated in FIG. 2, the management device 400 manages the additional information included in the service registration request received through the 3G network and the WiFi network, for example, the subscriber identification information (for example, IMSI), the access information, and the service classification information (initial, update, and remove) in a form of table information for each subscriber, separately generates a key value mapped into the terminal device 100 in a one-to-one correspondence, inserts the corresponding key value into a service registration result, and provides the service registration result to the terminal device 100.

Meanwhile, the management device 400 can determine a new service registration, an access address update, and a service deregistration of the terminal device 100 based on the service classification information (initial, update, and remove) included in the additional information.

Here, the access address update may be performed, for example, when the currently accessed first network device 200 or second network device 300 is changed according to a location movement of the terminal device 100 in a state where the service registration of the terminal device 100 for the 3G network and the WiFi network is completed.

That is, when the first network device 200 or second network device 300 to which the terminal device 100 currently accesses is changed according to the location movement of the terminal device 100, the management device 400 receives a release request for the access information received from the terminal device 100.

Accordingly, the management device 400 determines whether the release request is an effective request through identification of the subscriber identification information or the key value included in the corresponding request. As a result of the determination, when the release request is the effective request, the management device 400 deletes pre-stored access information to notify of the corresponding result and receives a new access information registration request from the terminal device 100, thereby performing a new access information registration after determining whether the corresponding request is the effective request.

Meanwhile, as illustrated in FIG. 3, in the table information for each subscriber, the management device 400 can additionally manage a network selection policy for traffic distributions in the heterogeneous network environment, for example, a source IP, a source port, a destination IP, a destination port, protocol (UDP, TCP or the like) information, and a traffic distribution rate for each of the 3G network and WiFi network.

Here, the management device 400 can register and manage the network selection policy provided from the policy management device 600 in the service registration of the terminal device 100 and further apply a network selection policy changed in real time through network status monitoring in order to efficiently provide the simultaneous data transmission service.

That is, the management device 400 can receive from the terminal device 100 the network selection policy provided from the policy management device 600 in the service registration of the terminal device 100 to register and manage the network selection policy in the table information for each subscriber, or combine the network selection policy directly transmitted from the policy management device 600 and the network selection policy transmitted through the terminal device 100 in the service registration of the terminal device 100 to register and manage the combined network selection policy.

Further, when the network selection policy is changed through the network status monitoring, for example, when the simultaneous data transmission service between the terminal device 100 and the management device 400 is used, the management device 400 which identifies throughput of transmitted data for a predetermined time, reports a status according to network link status monitoring, and recognizes network disconnection through whether a status signal having a regular cycle is received changes a traffic distribution rate for each of the 3G network and the WiFi network, and the detected information may be transmitted to the policy management device 600 and then used for a new network selection policy as necessary.

Here, in the identification of the throughput of the transmitted data for the predetermined time, the throughput can be identified based on a response message received from a receiver side in accordance with order information inserted at regular intervals in data transmission between the terminal device 100 and the management device 400. Alternatively, order information initially inserted in data reception is identified and then the throughput received for the predetermined time is identified. Accordingly, a current status for each of the currently used networks can be identified.

In addition, the detection of the network link status may be performed at the variable WiFi network in network mobility and stability, and the second network device 300 located in the WiFi network detects a link status of the WiFi network in real time based on a pre-designated status and capability factor and transmits a detected result to the management device 400.

Furthermore, it is preferable that the identification of whether the status signal is received is performed in the variable WiFi network in a network mobility and stability aspect like the detection of the network link status, and the terminal device 100 continuously transmits the status signal having the regular cycle to the management device 400 through the WiFi network and the management device 400 having received the status signal can identify whether the WiFi network is disconnected by identifying whether the corresponding signal is received.

Next, when the service registration process between the terminal device 100 and the management device 400 is completed, a simultaneous data transmission process between the terminal device 100 and the management device 400 is performed, and the following description will be made based on an uplink process in which the terminal device 100 transmits the data to the management device 400.

The terminal device 100 is configured to divide the data to be transmitted into partial data to use the simultaneous transmission service.

That is, the terminal device 100 is configured to divide the data to be transmitted into partial data corresponding to the number of networks for the simultaneous data transmission using the heterogeneous network environment, that is, the 3G network and the WiFi network, and the division process may be performed according to a network selection policy transmitted from the policy management device 600 or a changed traffic distribution rate for each network received from the management device 400 through real time network status monitoring.

In other words, the terminal device 100 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, 100% of the 3G network and 0% of the WiFi network and the like.

Further, the terminal device 100 is configured to insert additional information into the selected first partial data and second partial data.

That is, the terminal device 100 is configured to insert identifiers into the divided first partial data and second partial data to allow the management device 400 having received the divided first partial data and second partial data through the 3G network and the WiFi network to identify that the first partial data and the second partial data are the partial data provided from the terminal device 100.

Further, the terminal device 100 is configured to insert first order information for identifying orders of a plurality of partial data included in the first partial data into the first partial data and further insert second order information for identifying orders of partial data included in the second partial data into the second partial data to allow the management device 400 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the management device 400 having received the first partial data and the second partial data.

Further, the terminal device 100 is configured to insert access information for transmitting the divided first partial data and second partial data.

That is, the terminal device 100 inserts access information for the access to the 3G network, that is, access information of the first network device 200, access information of the management device 400, and access information of the external device 500 allocated during the service registration process to configure a header of the first partial data, so that the first partial data can be transmitted to the management device 400 via the first network device 200 and the data through reconstructed the management device 400 is additionally transmitted to the external device 500.

Further, the terminal device 100 inserts access information for the access to the WiFi network, that is, access information of the second network device 300, access information of the management device 400, and access information of the external device 500 allocated during the service registration process to configure a header of the second partial data, so that the second partial data can be transmitted to the management device 400 via the second network device 300 and the data reconstructed through the management device 400 is finally transmitted to the external device 500.

Furthermore, the terminal device 100 transmits the first partial data and the second partial data to the management device 400 through the 3G network and the WiFi network respectively based on the access information inserted into the headers.

That is, after inserting the additional information and the access information of each of the divided first partial data and second partial data, the terminal device 100 drives a communication module mounted to access the 3G network based on the corresponding access information to transmit the first partial data to the first network device 200 and drives a separate communication module mounted to access the WiFi network to transmit the second partial data to the second network device 300 at the same time.

The management device 400 is configured to receive the first partial data and second partial data transmitted from the terminal device 100.

That is, the management device 400 simultaneously receives the first partial data transmitted via the first network device 200 located in the 3G network and the second partial data transmitted via the second network device 300 located in the WiFi network through a communication route formed according to the access information inserted into the first partial data and the second partial data.

Further, the management device 400 is configured to reconstruct the data by combining the received first partial data and second partial data.

That is, the management device 400 is configured to identify that the first partial data and the second partial data are the partial data provided from the terminal device 100 by using the identifiers included in the first partial data and the second partial data, and identify orders of the partial data by using first order information included in the first partial data and second order information included in the second partial data at the same time to mix (or rearrange) the partial data included in the first partial data and the second partial data based on the identified orders and combine the mixed (or rearranged) first partial data and second partial data, thereby reconstructing the data transmitted from the terminal device 100.

Further, the management device 400 is configured to transmit the reconstructed data to the external device 500.

That is, the management device 400 identifies the access information of the external device 500 inserted into the first partial data and the second partial data to transmit the reconstructed data to be transmitted to the external device 500. At this time, as the external device 500 is located in an external network, the management device 400 performs a Network Address Translation (NAT) function to switch the access information of the external device 500 inserted into the first partial data and the second partial data to its own address information and thus access the external device 500.

Next, in connection with the simultaneous data transmission process between the terminal device 100 and the management device 400, the following description will be made based on the downlink process in which the management device 400 transmits the data to the terminal device 100.

The management device 400 is configured to divide the data to be transmitted into partial data to use the simultaneous transmission service.

That is, the management device 400 divides the data to be transmitted into the partial data corresponding to the number of networks for the simultaneous data transmission using the heterogeneous network environment, that is, the 3G network and the WiFi network, and the division process may be performed according to the network selection policy transmitted from the policy management device 600 or the traffic distribution rate for each network changed according to the real time network status monitoring.

In other words, the management device 400 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the management device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network and the like.

Further, the management device 400 is configured to insert additional information into the selected first partial data and second partial data.

That is, the management device 400 inserts the identifiers into the divided first partial data and second partial data to allow the terminal device 100 having received the divided first partial data and second partial data through the 3G network and the WiFi network to identify that the first partial data and the second partial data are the partial data provided from management device 400.

Further, the management device 400 is configured to insert first order information for identifying orders of a plurality of partial data included in the first partial data into the first partial data and further insert second order information for identifying orders of partial data included in the second partial data into the second partial data to allow the terminal device 100 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the terminal device 100 having received the first partial data and the second partial data.

Further, the management device 400 is configured to insert access information for transmitting the divided first partial data and second partial data.

That is, the management device 400 inserts access information for the access to the 3G network, that is, access information of the first network device 200, and access information of the terminal device 100 allocated during the service registration process to configure the header of the first partial data, so that the first partial data can be transmitted to the terminal device 100 via the first network device 200.

Further, the management device 400 inserts access information for the access to the WiFi network, that is, access information of the second network device 300, and access information of the terminal device 100 allocated during the service registration process to configure the header of the second partial data, so that the second partial data can be transmitted to the management device 400 via the second network device 300.

Furthermore, the management device 400 transmits the first partial data and the second partial data to the terminal device 100 through the 3G network and the WiFi network respectively based on the access information inserted into each of the headers.

That is, after inserting the additional information and the access information of the divided first partial data and second partial data, the management device 400 drives a communication module mounted to access the 3G network based on the corresponding access information to transmit the first partial data to the first network device 200 and drives a separate communication module mounted to access the WiFi network to transmit the second partial data to the second network device 300 at the same time.

The terminal device 100 is configured to receive the first partial data and second partial data transmitted from the management device 400.

That is, the terminal device 100 simultaneously receives the first partial data transmitted via the first network device 200 located in the 3G network and the second partial data transmitted via the second network device 300 located in the WiFi network through a communication route formed according to the access information inserted into the first partial data and the second partial data.

Further, the terminal device 100 is configured to reconstruct the data by combining the received first partial data and second partial data.

That is, the terminal device 100 identifies that the first partial data and the second partial data are the partial data provided from the management device 400 by using the identifiers included in the first partial data and the second partial data and identifies orders of the partial data by using first order information included in the first partial data and second order information included in the second partial data at the same time to mix (or rearrange) the partial data included in the first partial data and the second partial data based on the identified orders and combine the mixed (or rearranged) first partial data and second partial data, thereby reconstructing the data to be transmitted which is transmitted from the management device 400.

Meanwhile, according to at least another embodiment of the present disclosure, a terminal device 700 corresponding to the transmission device can acquire a network selection policy corresponding to a current location from the policy management device 600.

For example, the terminal device 700 acquires the network selection policy from the policy management device 600 in order to select the particular second network device 300 from a plurality of second network devices 300 for operating the WiFi network which is accessible in the current location, that is, the wireless local area network and accesses the selected particular second network device 300.

At this time, the terminal device 700 transmits a policy request including location information to the policy management device 600 for managing status information for each second network device 300, for example, the number of accessed terminal devices and a traffic status to acquire the network selection policy including information on the available optimal second network device 300 selected based on the status information from the plurality of second network devices 300 corresponding to the current location of the terminal device 700, that is, information on the network device to be accessed from the policy management device 600.

Further, the terminal device 700 transmits the policy request including a list of the detected second network devices 300 in the current location to acquire the network selection policy including the information on the available optimal second network device 300 selected based on the status information, that is, the information on the network device to be accessed corresponding to a part of the list of a plurality of the detected second network devices 300 in the current location of the terminal device 700 from the policy management device 600.

Furthermore, in connection with an operation of transmitting the policy request including the list of the detected second network devices 300 in the current location, the terminal device 700 can acquire the network selection policy including information on the network device to be accessed of which an access priority is set in accordance with the list of the detected networks from the policy management device 600.

Further, the terminal device 700 is configured to select partial data divided from the data to be transmitted to use the simultaneous transmission service.

That is, the terminal device 700 divides the data to be transmitted into partial data corresponding to the number of networks for the simultaneous data transmission using the heterogeneous network environment, that is, the 3G network and the WiFi network, and the division process may be performed according to the network selection policy transmitted from the policy management device 600.

In other words, the terminal device 700 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the terminal device 700 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Then, the terminal device 700 is configured to access the particular second network device 200 based on the network selection policy to transmit the partial data.

That is, the terminal device 700 selects the particular second network device 300 from a plurality of second network devices 300 for operating the WiFi network accessible in the current location, that is, the wireless local area network based on information on the network device to be accessed included in the network selection policy and accesses the selected particular second network device 300 to transmit the second partial data.

Accordingly, the terminal device 700 may transmit the first partial data to the first network device 200 located in the 3G network, and the first network device 200 may transmit the first partial data to the management device 400 corresponding to the reception device. Further, the terminal device 700 may transmit the second partial data to the selected particular second network device 300 based on the information on the network device to be accessed, and the second network device 300 may transmit the second partial data to the management device 400 corresponding to the reception device.

The management device 400 is configured to receive the first partial data from the first network device 200 and the second partial data from the second network device 300, and reconstruct the data to be transmitted which the terminal device 700 desires to transmit by combining the first partial data and the second partial data based on virtual network access information included in the received first partial data and second partial data to reconstitute (or generate) the data.

That is, the management device 400 can reconstitute (or generate)the original data to be transmitted by recognizing the first partial data and the second partial data having the same virtual network access information based on the virtual network access information included in received several partial data and mixing (or rearranging) and combining the first partial data and the second partial data according to order information included in the corresponding partial data.

Further, the management device 400 is configured to transmit the reconstructed (or generated) data to be transmitted to the external device 500 by using access information of the external device corresponding to a final destination recognized through at least one partial data of the first partial data and the second partial data.

As described above, during the process in which the first partial data and the second partial data divided by the terminal device 700 pass through the management device 400 through the heterogeneous networks, the first partial data and the second partial data are combined by the management device 400 to be reconstructed as the original data to be transmitted, and then the reconstructed data to be transmitted is transmitted to the external device 500 corresponding to the final destination as one data.

The policy management device 600 is configured to acquire status information for each network device.

That is, the policy management device 600 is configured to collect the status information transmitted from the second network device 300 on a set period or in real time, for example, the number of accessed terminal devices and the traffic status to manage the collected status information for each second network device 300.

Here, the traffic status may include at least one status of a quality status such as an average transmission speed, a delay time and the like and a policy status such as an accessible channel (for example, 2.4 GHz/5 GHz) supported by the second network device 300, QoS such as allowable throughput per person supported by the second network 300 and the like.

Further, in addition to the status information for each second network device 300, the policy management device 600 may collect network status information received from the terminal device 700 and the management device 400 according to various network parameters on the heterogeneous networks including, for example, a subscriber preference, a subscriber type, a subscription payment system, an application type to be serviced and the like, and a network status change.

In addition, the policy management device 600 is configured to generate information on the network device to be accessed based on the acquired status information in accordance with the current location of the terminal device 700.

That is, when the policy request including location information is received from the terminal device 700, the policy management device 600 can select the available optimal second network device 300 selected based on the status information from a plurality of the second network devices 300 corresponding to the current location of the terminal device 700 and generate the information on the network device to be accessed.

Further, the policy management device 600 receives the policy request including the list of a plurality of the detected second network devices 300 in the current location of the terminal device 700 from the terminal device 700 to generate information on the available optimal second network device 300 selected based on the status information, that is, the information on the network device to be accessed corresponding to a part of the list of the detected second network devices 300 in the current location of the terminal device 700.

In addition, in connection with the policy request including the list of the detected second network devices 300 in the current location received from the terminal device 700, the policy management device 600 sets an access priority corresponding to the list of the detected network devices based on the status information to generate the information on the network device to be accessed.

Further, the policy management device 600 is configured to provide the network selection policy including the generated information on the network device to be accessed to the terminal device 700 to induce the terminal device 700 to access the particular second network device 300.

That is, the policy management device 600 induces the terminal device 700 to select the particular second network device 300 from a plurality of second network devices 300 for operating the accessible WiFi network in the current location, that is, the wireless local area network and access the selected particular second network device 300 by providing the network selection policy including the generated information on the network device to be accessed to the terminal device 700.

Meanwhile, the policy management device 600 can determine a network selection policy including relative usage rates between networks to divide the data to be transmitted into partial data corresponding to the number of networks for the simultaneous data transmission using the heterogeneous network environment, that is, the 3G network and the WiFi network based on the network status information received from the terminal device 700 and the management device 400 according to various network parameters on the heterogeneous networks including, for example, a subscriber preference, a subscriber type, a subscription payment system, an application type to be serviced and the like, and a network status change.

Figure 4:
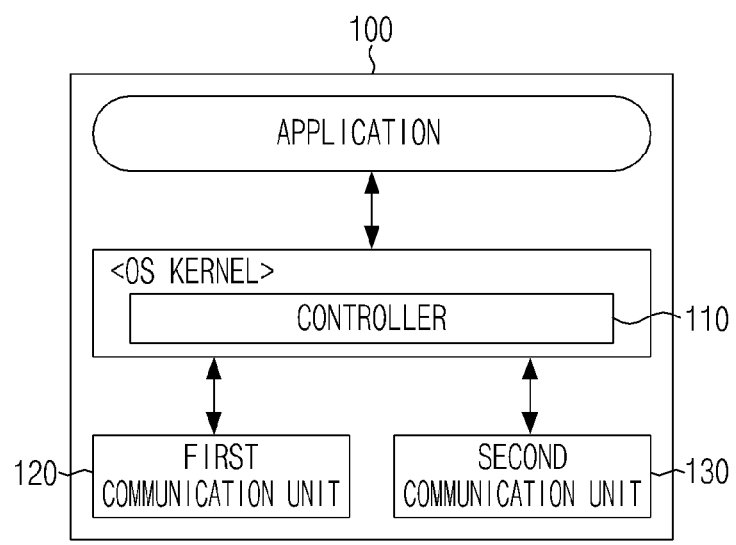
FIG. 4 is a schematic block diagram of a terminal device according to at least one embodiment of the present disclosure.

Hereinafter, a more detailed configuration of the terminal device 100 performing an uplink operation according to at least one embodiment of the present disclosure will be described with reference to FIG. 4.

That is, the terminal device 100 performing the uplink process includes a controller 110 configured to divide data into partial data, a first communication unit 120 configured to transmit first partial data corresponding to a part of the partial data, and a second communication unit 130 configured to transmit second partial data corresponding to another part of the partial data.

Here, the controller 110 may be mounted to an OS kernel installed in the terminal device 100, and perform a series of operations for a simultaneous data transmission service according to a request of a particular application installed in the terminal device 100 through the mounting or download.

Further, the first communication unit 120 refers to a communication module for interworking with the first network device 200 by using the 3G network, and the second communication unit 130 refers to a communication module for interworking with the second network device 300 by using the WiFi network.

The controller 110 is configured to divide data to be transmitted into partial data to use the simultaneous transmission service.

That is, after the service registration through the acquisition of the access information for the access to the 3G network and the access to the WiFi network, the controller 110 divides the data to be transmitted into partial data corresponding to the number of networks for the simultaneous data transmission using a heterogeneous network environment, that is, the 3G network and the WiFi network, and the division process may be performed according to the network selection policy transmitted from the policy management device 600 or the changed traffic distribution rate for each network received from the management device 400 according to the real time network status monitoring.

In other words, the controller 110 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 110 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, 100% of the 3G network and 0% of the WiFi network and the like.

Further, the controller 110 is configured to insert additional information into the selected first partial data and second partial data.

That is, the controller 110 inserts identifiers into the divided first partial data and second partial data to allow the management device 400 having received the divided first partial data and second partial data through the 3G network and the WiFi network to identify that the first partial data and the second partial data are the partial data provided from the terminal device 100.

Further, the controller 110 is configured to insert first order information for identifying orders of a plurality of partial data included in the first partial data into the first partial data and further insert second order information for identifying orders of partial data included in the second partial data into the second partial data to allow the management device 400 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the management device 400 having received the first partial data and the second partial data.

Further, the controller 110 is configured to insert access information for transmitting the divided first partial data and second partial data.

That is, the controller 110 inserts access information for the access to the 3G network, that is, access information of the first network device 200, access information of the management device 400, and access information of the external device 500 allocated during the service registration process to configure a header of the first partial data, so that the first partial data can be transmitted to the management device 400 via the first network device 200 and the data reconstructed through the management device 400 is additionally transmitted to the external device 500.

Further, the controller 110 inserts access information for the access to the WiFi network, that is, access information of the second network device 300, access information of the management device 400, and access information of the external device 500 allocated during the service registration process to configure a header of the second partial data, so that the second partial data can be transmitted to the management device 400 via the second network device 300 and the data reconstructed through the management device 400 is finally transmitted to the external device 500.

Furthermore, the controller 110 provides the first partial data and the second partial data to the first communication unit 120 and the second communication unit 130 respectively to transmit the first partial data and the second partial data to the management device 400 through the 3G network and the WiFi network respectively based on the access information inserted into the headers.

That is, after inserting the additional information and the access information of the divided first partial data and second partial data, the controller 110 provides the corresponding access information to the first communication unit 120 and the second communication unit 130 and drives the first communication 120 mounted to access the 3G network to transmit the first partial data to the first network device 200 and drives the second communication unit 130 mounted to access the WiFi network to transmit the second partial data to the second network device 300 at the same time.

Hereinafter, a more detailed configuration of the terminal device 100 performing a downlink operation according to at least one embodiment of the present disclosure will be described with reference to FIG. 4.

That is, the terminal device 100 performing the downlink process includes the controller 110 configured to reconstruct the data by combining partial data, the first communication unit 120 configured to receive first partial data corresponding to a part of the partial data divided from the data, and the second communication unit 130 configured to receive second partial data corresponding to another part of the divided partial data.

Here, the controller 110 may be mounted to an OS kernel installed in the terminal device 100. The controller 110 may reconstruct the partial data transmitted from the management device 400 and provide the reconstructed data to a particular application installed in the terminal device 100 through the mounting or download.

Further, the first communication unit 120 refers to a communication module for interworking with the first network device 200 by using the 3G network, and the second communication unit 130 refers to a communication module for interworking with the second network device 300 by using the WiFi network.

The controller 110 is configured to receive the first partial data and the second partial data transmitted from the management device 400.

That is, through a communication route formed according to the access information inserted into the first partial data and the second partial data, the controller 110 simultaneously receives the first partial data transmitted via the first network device 200 located in the 3G network through the first communication unit 120 and the second partial data transmitted via the second network device 300 located in the WiFi network through the second communication unit 130.

Further, the controller 110 is configured to reconstruct the data by combining the received first partial data and second partial data.

That is, the controller 110 identifies that the first partial data and the second partial data are the partial data provided from the management device 400 by using the identifiers included in the first partial data and the second partial data and identifies orders of the partial data by using first order information included in the first partial data and second order information included in the second partial data at the same time to mix (or rearrange) the partial data included in the first partial data and the second partial data based on the identified orders and combine the mixed (or rearranged) first partial data and second partial data, thereby reconstructing the data to be transmitted which is transmitted from the management device 400.

Figure 5:
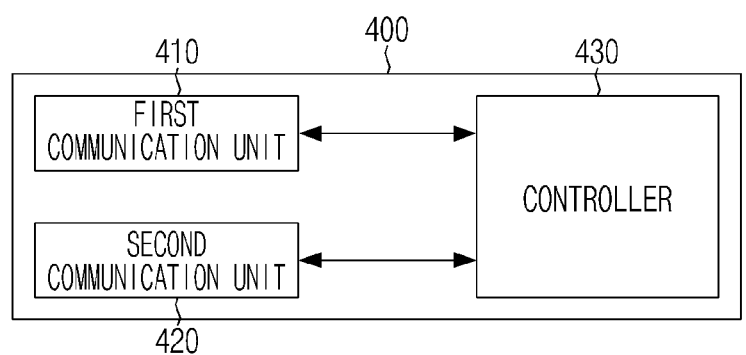
FIG. 5 is a schematic block diagram of configuration of a management device according to at least one embodiment of the present disclosure.

Hereinafter, a more detailed configuration of the management device 400 performing the uplink operation according to at least one embodiment of the present disclosure will be described with reference to FIG. 5.

That is, the management device 400 performing the uplink process includes a first communication unit 410 configured to receive first partial data corresponding to a part of the partial data divided from the data, a second communication unit 420 configured to receive second partial data corresponding to another part of the divided partial data, and a controller 430 configured to reconstruct the data by combining the partial data.

The controller 430 is configured to receive the first partial data and the second partial data transmitted from the terminal device 100.

That is, through a communication route formed according to the access information inserted into the first partial data and the second partial data, the controller 430 simultaneously receives the first partial data transmitted via the first network device 200 located in the 3G network through the first communication unit 410 and the second partial data transmitted via the second network device 300 located in the WiFi network through the second communication unit 420.

Further, the controller 430 is configured to reconstruct the data by combining the received first partial data and second partial data.

That is, the controller 430 identifies that the first partial data and the second partial data are the partial data provided from the management device 400 by using the identifiers included in the first partial data and the second partial data, and identifies orders of the partial data by using first order information included in the first partial data and second order information included in the second partial data at the same time.

Further, the controller 430 is configured to mix (or rearrange) the partial data included in the first partial data and the second partial data based on the identified orders, and combine the mixed (or rearranged) first partial data and second partial data to reconstruct the data to be transmitted which is transmitted from the management device 400.

Furthermore, the controller 430 is configured to transmit the reconstructed data to the external device 500.

That is, the controller 430 identifies the access information of the external device 500 inserted into the first partial data and the second partial data to transmit the reconstructed data to be transmitted to the external device 500. At this time, as the external device 500 is located in an external network, the management device 400 performs a Network Address Translation (NAT) function to switch the access information of the external device 500 inserted into the first partial data and the second partial data to its own address information and thus access the external device 500.

Hereinafter, a more detailed configuration of the management device 400 performing the downlink operation according to at least one embodiment of the present disclosure will be described with reference to FIG. 5.

That is, the management device 400 performing the downlink process includes the first communication unit 410 configured to transmit first partial data corresponding to a part of the partial data, the second communication unit 420 configured to transmit second partial data corresponding to another part of the partial data, and the controller 430 configured to divide the data into the partial data.

The controller 430 is configured to divide the data to be transmitted into the partial data to use the simultaneous transmission service.

That is, after the service registration through the acquisition of the access information for the access to the 3G network and the access to the WiFi network, the controller 4300 divides the data to be transmitted into partial data corresponding to the number of networks for the simultaneous data transmission using a heterogeneous network environment, that is, the 3G network and the WiFi network, and the division process may be performed according to the network selection policy transmitted from the policy management device 600 or the traffic distribution rate for each network changed according to the real time network status monitoring.

In other words, the controller 430 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 430 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, 100% of the 3G network and 0% of the WiFi network and the like.

Further, the controller 430 is configured to insert additional information into the selected first partial data and second partial data.

That is, the controller 430 inserts identifiers into the divided first partial data and second partial data to allow the terminal device 100 having received the divided first partial data and second partial data through the 3G network and the WiFi network to identify that the first partial data and the second partial data are the partial data provided from the management device 400.

Further, the controller 430 is configured to insert first order information for identifying orders of a plurality of partial data included in the first partial data into the first partial data and further insert second order information for identifying orders of partial data included in the second partial data into the second partial data to allow the terminal device 100 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the terminal device 100 having received the first partial data and the second partial data.

Further, the controller 430 is configured to insert access information for transmitting the divided first partial data and second partial data.

That is, the controller 430 inserts access information for the access to the 3G network, that is, access information of the first network device 200, access information of the management device 400, and access information of the external device 500 allocated during the service registration process to configure a header of the first partial data, so that the first partial data can be transmitted to the terminal device 100 via the first network device 200.

Further, the controller 430 inserts access information for the access to the WiFi network, that is, access information of the second network device 300, access information of the management device 400, and access information of the external device 500 allocated during the service registration process to configure a header of the second partial data, so that the second partial data can be transmitted to the terminal device 100 via the second network device 300.

Furthermore, the controller 430 is configured to provide the first partial data and the second partial data to the first communication unit 410 and the second communication unit 420 to transmit the first partial data and the second partial data to the terminal device 100 through the 3G network and the WiFi network based on the access information inserted into the headers.

That is, after inserting the additional information and the access information of the divided first partial data and second partial data, the controller 430 provides the corresponding access information to the first communication unit 410 and the second communication unit 4200 and drives the first communication 410 mounted to access the 3G network to transmit the first partial data to the first network device 200 and drives the second communication unit 420 mounted to access the WiFi network to transmit the second partial data to the second network device 300 at the same time.

As described above, according to the heterogeneous network based-simultaneous data transmission service system according to the present disclosure, a data transmission rate of each access network is determined in the heterogeneous network environment, data to be transmitted is divided according to the determined data transmission rate, and the divided data is simultaneously transmitted through heterogeneous networks, and a receiver side receives and combines the divided data so as to reconstruct the data to be transmitted. Accordingly, a data transmission speed increases by transmitting partial data divided from the data to be transmitted, and data service quality is improved and network stability is secured by effectively changing data traffic of entire networks.

Hereinafter, a heterogeneous network based-simultaneous data transmission service method according to at least one embodiment of the present disclosure will be described with reference to FIGS. 6 to 13. Here, configurations the same as those illustrated in FIGS. 1 to 5 will be described by using the corresponding reference numerals for convenience of the description.

Figure 6:
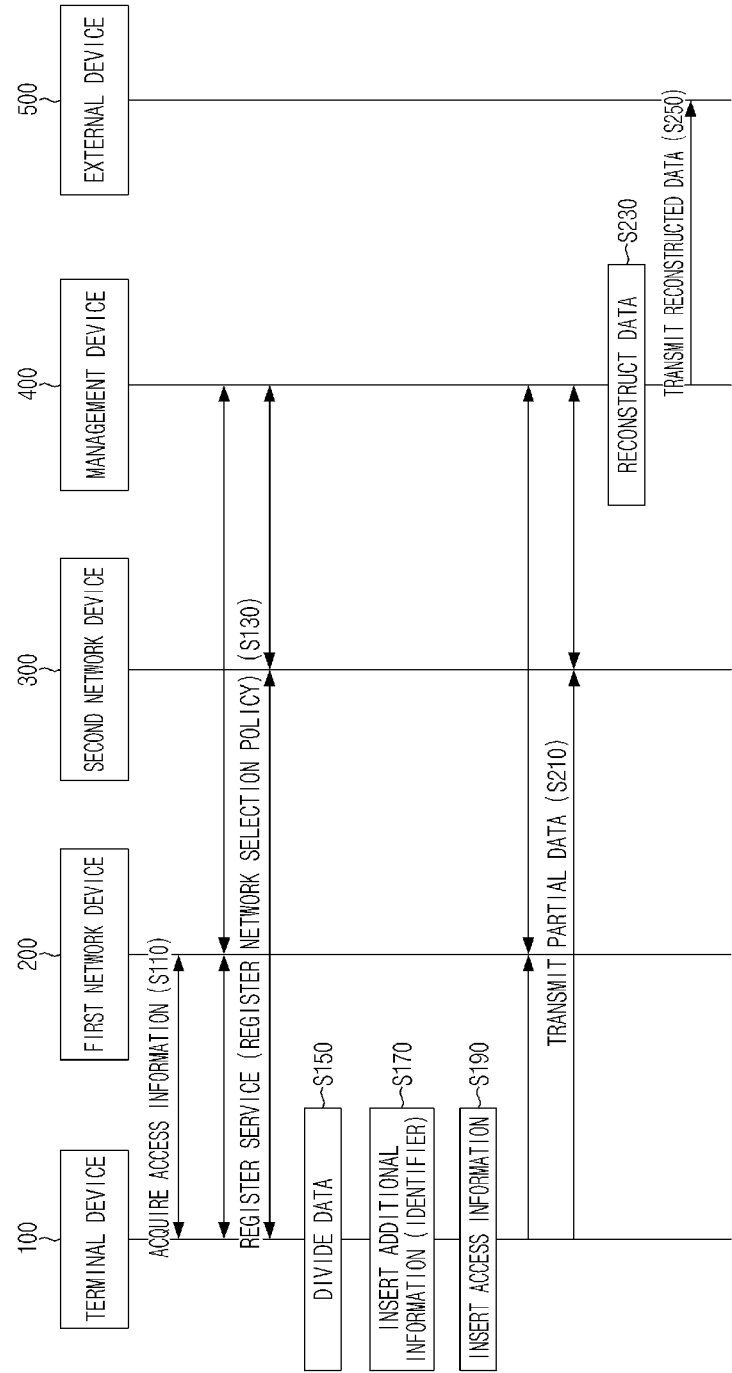
FIG. 6 is a flowchart of an uplink operation method of a heterogeneous network based-simultaneous data transmission service system according to at least one embodiment of the present disclosure.

First, an uplink operation method of the heterogeneous network based-simultaneous data transmission service system according to at least one embodiment of the present disclosure will be described with reference to FIG. 6.

In order to use the simultaneous data transmission service in the heterogeneous network environment, the process of acquiring the access information between the terminal device 100 and the management device 400 is first performed in step S110.

Figure 7:
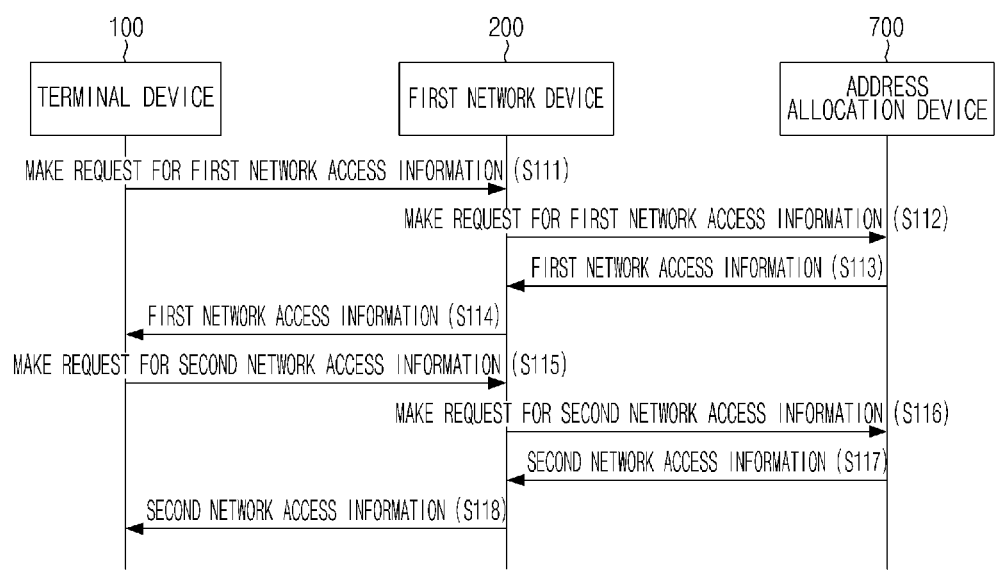
FIG. 7 is a flowchart of an access information acquiring process according to at least one embodiment of the present disclosure.

Preferably, as illustrated in FIG. 7, the terminal device 100 registers a location of the 3G network and accesses the first network device 200 to make a request for access information in order to acquire the access information of the management device 400 for the access to the 3G network in step S111.

Accordingly, the first network device 200 receives the access information of the management device 400 for the access to the 3G network, that is, a private IP from the address allocation device 700, for example, the DNS server according to the access information request transmitted from the terminal device 100 and transmits the received private IP to the terminal device 100 in steps S112 to S114.

Further, the terminal device 100 additionally makes a request for access information of the management device 400 for the access to the WiFi network to the first network device 200, and the first network device 200 having received the access information receives the access information of the management device 400 for the access to the WiFi network, that is, a virtual IP mapped into the access information of the management device 400 for the access to the 3G network, which is the private IP, from the address allocation device 700, for example, the DNS server and transmits the received virtual IP to the terminal device 100 in steps S115 to S118.

At this time, the management device 400 recognizes that the access information for the access to the 3G network and the access information for the access to the WiFi network are access information assigned to the same subscriber by managing the access information for the access to the 3G network and the access information for the access to the WiFi network assigned to the terminal device 100 as the same subscriber identification information (for example, IMSI).

Figure 8:
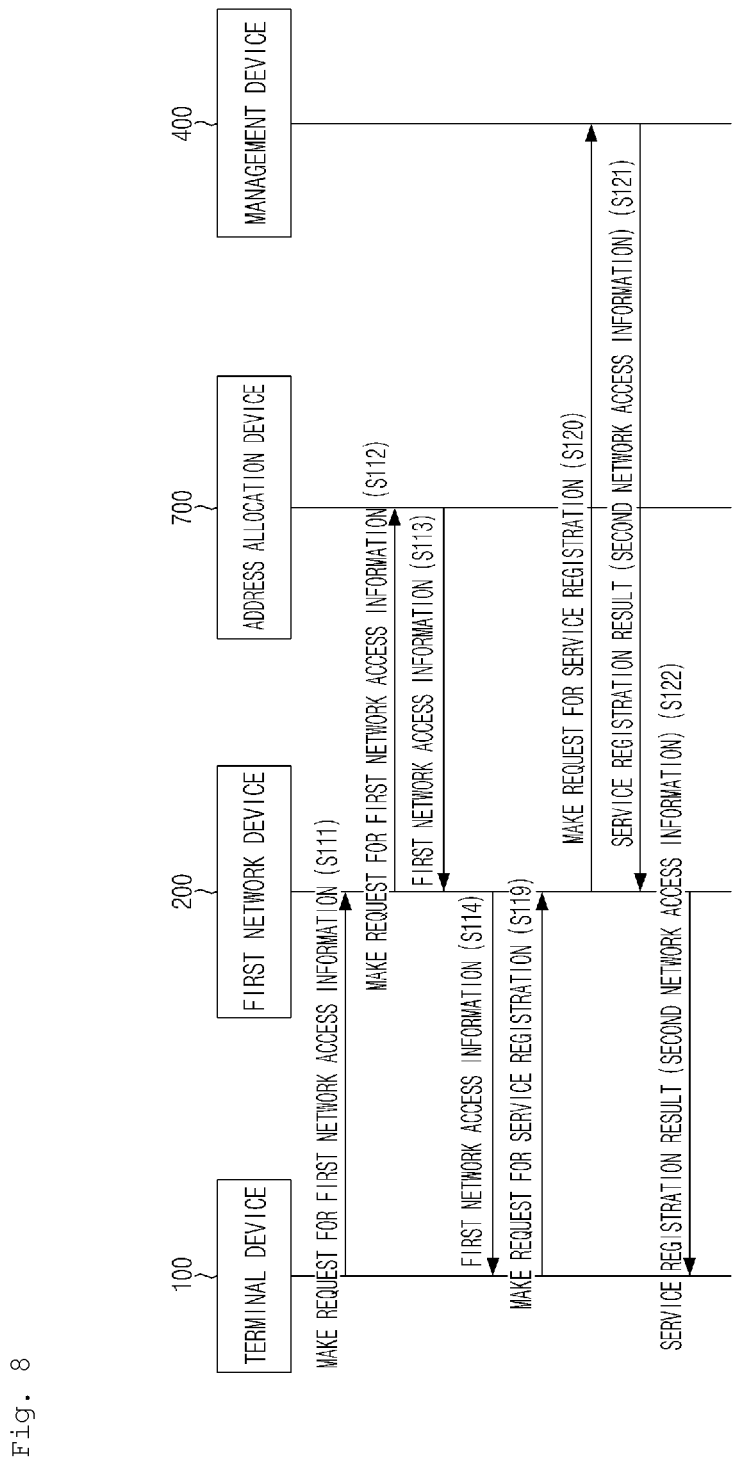
FIG. 8 is a flowchart of an access information acquiring process according to at least one embodiment of the present disclosure.

In at least another embodiment, as illustrated in FIG. 8, in connection with acquiring the access information of the management device 400 for the access to the WiFi network, the terminal device 100 can acquire the access information of the management device 400 for the access to the WiFi network from the management device 400 when making a request for the service registration through the first network device 200 in steps S119 to S122.

Meanwhile, as the second network device 300 located in a WiFi network area performs a Network Address Translation (NAT) function, an access address of the second network device 300 instead of access information of the initial terminal device 100 is transmitted with respect to access information of the terminal device 100 transmitted to the management device 400 through the second network device 300, and accordingly, the management device 400 recognizes in advance the access information of the second network device 300 on the WiFi network area in which the terminal device 100 is located to transmit/receive data to/from the terminal device 100 through the WiFi network.

To this end, the management device 400 acquires the access information of the second network device 300 included in the service registration request received from the terminal device 100 during the service registration process of the initial terminal device 100 through the WiFi network to store and manage the corresponding access information.

In other words, after acquiring the access information of the management device 400 for the access to the WiFi network through the 3G network, the terminal device 100 accesses the management device 400 through the second network device 300 based on the initially acquired access information to make a request for the service registration. In such a process, the management device 400 acquires WiFi network pass information included in the service registration request, that is, the access address of the second network device 300 and maps the access information of the terminal device 100 and the access address of the second network device 300 included in the corresponding service registration request to manage the mapped access information and access address as one access information.

Next, when the process of acquiring the access information of the management device 400 is completed, the service registration process between the terminal device 100 and the management device 400 is performed in step S130.

Figure 9:
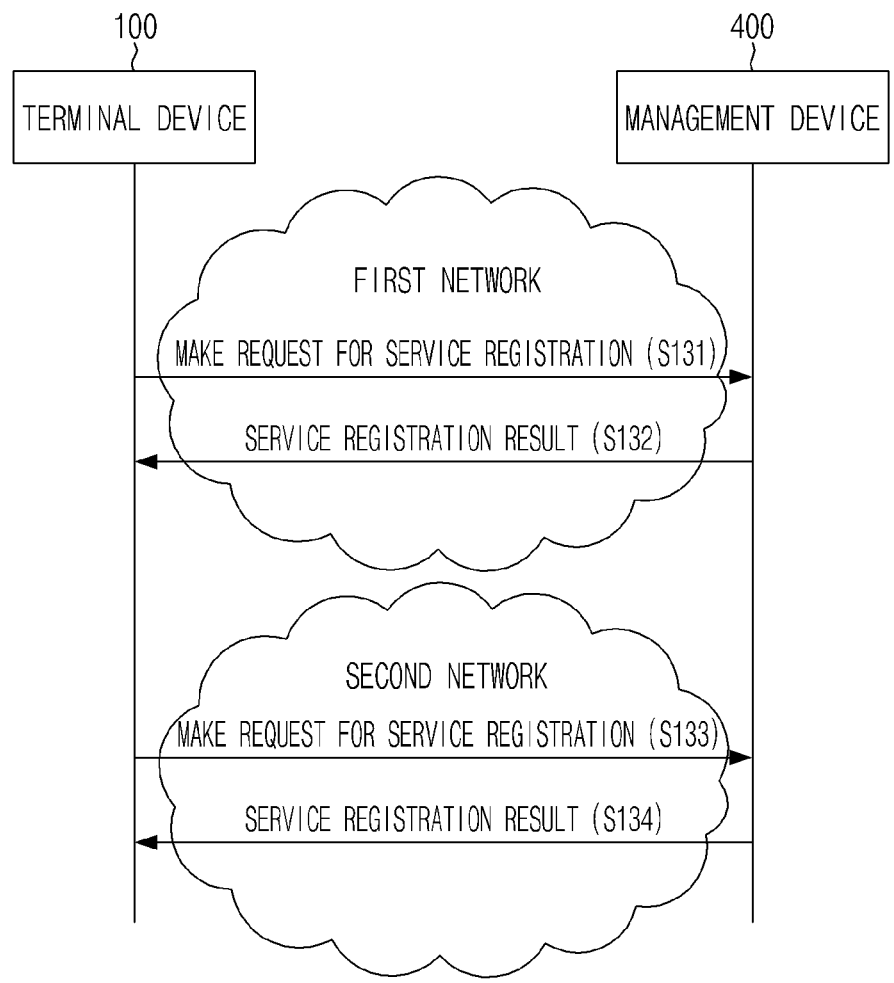
FIG. 9 is a flowchart of a service registration process according to at least one embodiment of the present disclosure.

In this connection, as illustrated in FIG. 9, the terminal device 100 accesses the management device 400 through each of the networks based on the acquired access information for the access to the 3G network and the acquired access information for the access to the WiFi network to make a request for the service registration in steps S131 and S133.

The management device 400 performs the service registration of the terminal device 100 by identifying additional information included in the service registration request received from the terminal device 100 through the 3G network and the WiFi network, for example, subscriber identification information (for example, IMSI), access information, and service classification information (initial, update, and remove) in steps S132 and S134.

At this time, as illustrated in FIG. 2, the management device 400 manages the additional information included in the service registration request received through the 3G network and the WiFi network, for example, the subscriber identification information (for example, IMSI), the access information, and the service classification information (initial, update, and remove) in a form of table information for each subscriber, separately generates a key value mapped into the terminal device 100 by one-to-one correspondence, inserts the corresponding key value into a service registration result, and provides the service registration result to the terminal device 100.

Meanwhile, the management device 400 can determine a new service registration, an access address update, and a service deregistration of the terminal device 100 based on the service classification information (initial, update, and remove) included in the additional information.

Here, the access address update may be performed, for example, when the currently accessed first network device 200 or second network device 300 is changed according to a location movement of the terminal device 100 in a state where the service registration of the terminal device 100 for the 3G network and the WiFi network is completed.

Figure 10:
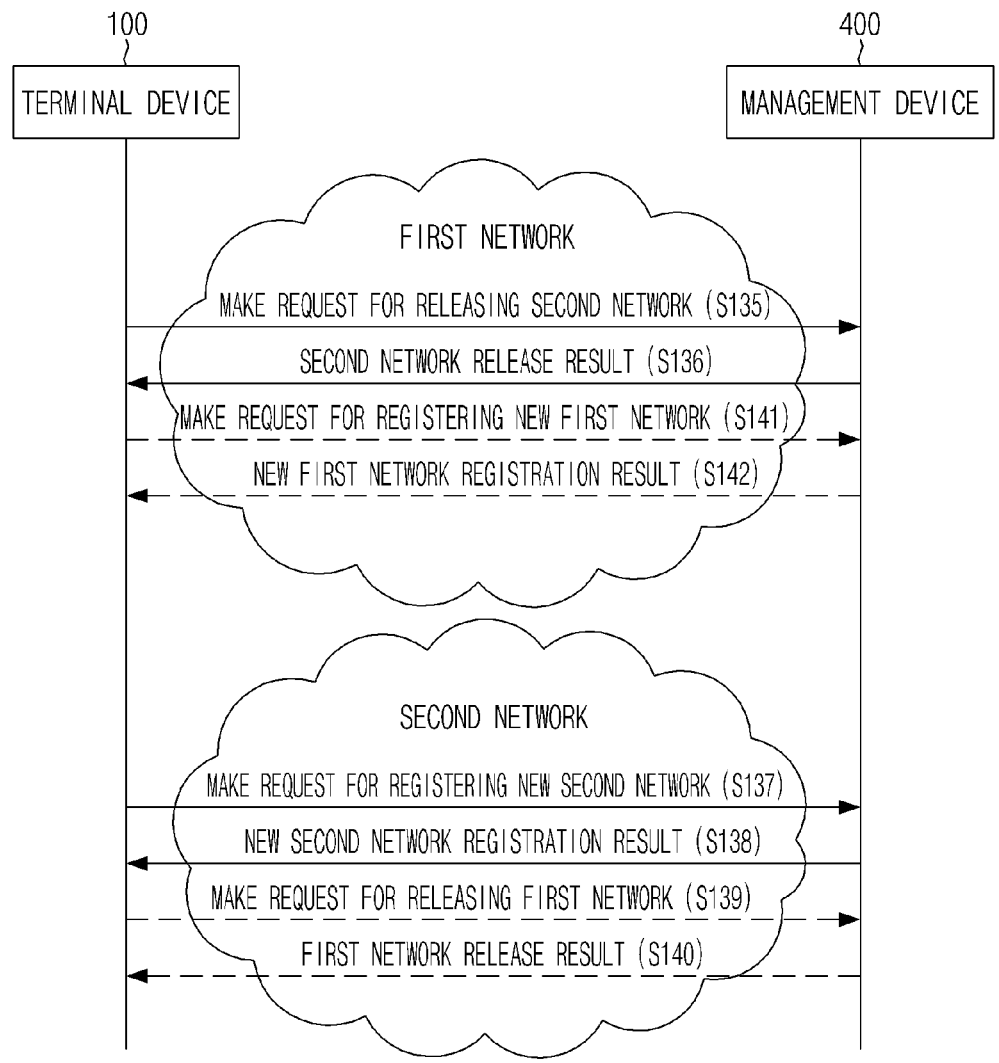
FIG. 10 is a flowchart of an access information changing process according to at least one embodiment of the present disclosure.

That is, as illustrated in FIG. 10, when the first network device 200 or second network device 300 to which the terminal device 100 currently accesses is changed according to the location movement of the terminal device 100, the management device 400 receives a release request for the access information received from the terminal device 100 in steps S135 and S139.

Accordingly, the management device 400 determines whether the release request is an effective request through identification of the subscriber identification information or the key value included in the corresponding request. As a result of the determination, when the release request is the effective request, the management device 400 deletes pre-stored access information to notify a corresponding result and receives a new access information registration request from the terminal device 100, thereby performing a new access information registration after determining whether the corresponding request is the effective request in steps S136 to S138 and S140 to S142.

Meanwhile, as illustrated in FIG. 3, in the table information for each subscriber, the management device 400 can additionally manage a network selection policy for traffic distributions in the heterogeneous network environment, for example, a source IP, a source port, a destination IP, a destination port, protocol (UDP, TCP or the like) information, and a traffic distribution rate for each of the 3G network and WiFi network.

Here, the management device 400 can register and manage the network selection policy provided from the policy management device 600 in the service registration of the terminal device 100 and further apply the network selection policy changed in real time through network status monitoring in order to efficiently provide the simultaneous data transmission service.

That is, the management device 400 can receive the network selection policy provided from the policy management device 600 from the terminal device 100 in the service registration of the terminal device 100 to register and manage the network selection policy in the table information for each subscriber, or combine the network selection policy directly transmitted from the policy management device 600 and the network selection policy transmitted through the terminal device 100 in the service registration of the terminal device 100 to register and manage the combined network selection policy.

Further, when the network selection policy is changed through the network status monitoring, for example, when the simultaneous data transmission service between the terminal device 100 and the management is used, the management device 400 which identifies throughput of transmitted data for a predetermined time, reports a status according to network link status monitoring, and recognizes network disconnection through whether a status signal having a regular cycle is received changes a traffic distribution rate for each of the 3G network and the WiFi network, and the detected information may be transmitted to the policy management device 600 and then used for a new network selection policy as necessary.

Here, in the identification of the throughput of the transmitted data for the predetermined time, the throughput can be identified based on a response message received from a receiver side in accordance with order information inserted at regular intervals in data transmission between the terminal device 100 and the management device 400. Alternatively, order information initially inserted in data reception is identified and then the throughput received for the predetermined time is identified. Accordingly, a current status for each of the currently used networks can be identified.

In addition, the detection of the network link status may be performed at the variable WiFi network in network mobility and stability, and the second network device 300 located in the WiFi network detects a link status of the WiFi network in real time based on a pre-designated status and capability factor and transmits a detected result to the management device 400.

Furthermore, it is preferable that the identification of whether the status signal is received is performed in the variable WiFi network in a network mobility and stability aspect like the detection of the network link status, and the terminal device 100 continuously transmits the status signal having the regular cycle to the management device 400 through the WiFi network and the management device 400 having received the status signal can identify whether the WiFi network is disconnected by identifying whether the corresponding signal is received.

Next, the terminal device 100 divides the data to be transmitted into partial data to use the simultaneous transmission service in step S150.

Preferably, the terminal device 100 divides the data to be transmitted into partial data corresponding to the number of networks for the simultaneous data transmission using the heterogeneous network environment, that is, the 3G network and the WiFi network, and the division process may be performed according to the network selection policy transmitted from the policy management device 600 or the changed traffic distribution rate for each network received from the management device 400 through real time network status monitoring.

In other words, the terminal device 100 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100 of the WiFi network, 100% of the 3G network and 0% of the WiFi network and the like.

Then, the terminal device 100 inserts additional information into the selected first partial data and second partial data in step S170.

Preferably, the terminal device 100 inserts identifiers into the divided first partial data and second partial data to allow the management device 400 having received the divided first partial data and second partial data through the 3G network and the WiFi network to identify that the first partial data and the second partial data are the partial data provided from the terminal device 100.

Further, the terminal device 100 inserts first order information for identifying orders of a plurality of partial data included in the first partial data into the first partial data and further inserts second order information for identifying orders of partial data included in the second partial data into the second partial data to allow the management device 400 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the management device 400 having received the first partial data and the second partial data.

Further, the terminal device 100 inserts access information for transmitting the divided first partial data and second partial data in step S190.

Preferably, the terminal device 100 inserts access information for the access to the 3G network, that is, access information of the first network device 200, access information of the management device 400, and access information of the external device 500 allocated during the service registration process to configure a header of the first partial data, so that the first partial data can be transmitted to the management device 400 via the first network device 200 and the data reconstructed through the management device 400 is additionally transmitted to the external device 500.

Further, the terminal device 100 inserts access information for the access to the WiFi network, that is, access information of the second network device 300, access information of the management device 400, and access information of the external device 500 allocated during the service registration process to configure a header of the second partial data, so that the second partial data can be transmitted to the management device 400 via the second network device 300 and the data reconstructed through the management device 400 is finally transmitted to the external device 500.

Then, the terminal device 100 transmits the first partial data and the second partial data to the management device 400 through the 3G network and the WiFi network based on the access information inserted into the headers in step S210.

That is, after inserting the additional information and the access information of the divided first partial data and second partial data, the terminal device 100 drives a communication module mounted to access the 3G network based on the corresponding access information to transmit the first partial data to the first network device 200 and drives a separate communication module mounted to access the WiFi network to transmit the second partial data to the second network device 300 at the same time.

Thereafter, the management device 400 reconstructs the data by combining the received first partial data and second partial data in step S230.

Preferably, the management device 400 identifies that the first partial data and the second partial data are the partial data provided from the terminal device 100 by using the identifiers included in the first partial data and the second partial data and identifies orders of the partial data by using first order information included in the first partial data and second order information included in the second partial data at the same time to mix (or rearrange) the partial data included in the first partial data and the second partial data based on the identified orders and combine the mixed (or rearranged) first partial data and second partial data, thereby reconstructing the data to be transmitted which is transmitted from the terminal device 100.

Thereafter, the management device 400 transmits the reconstructed data to the external device 500 in step S250.

Preferably, the management device 400 identifies the access information of the external device 500 inserted into the first partial data and the second partial data to transmit the reconstructed data to be transmitted to the external device 500. At this time, as the external device 500 is located in an external network, the management device 400 performs a Network Address Translation (NAT) function to switch the access information of the external device 500 inserted into the first partial data and the second partial data to its own address information and thus access the external device 500.

Figure 11:
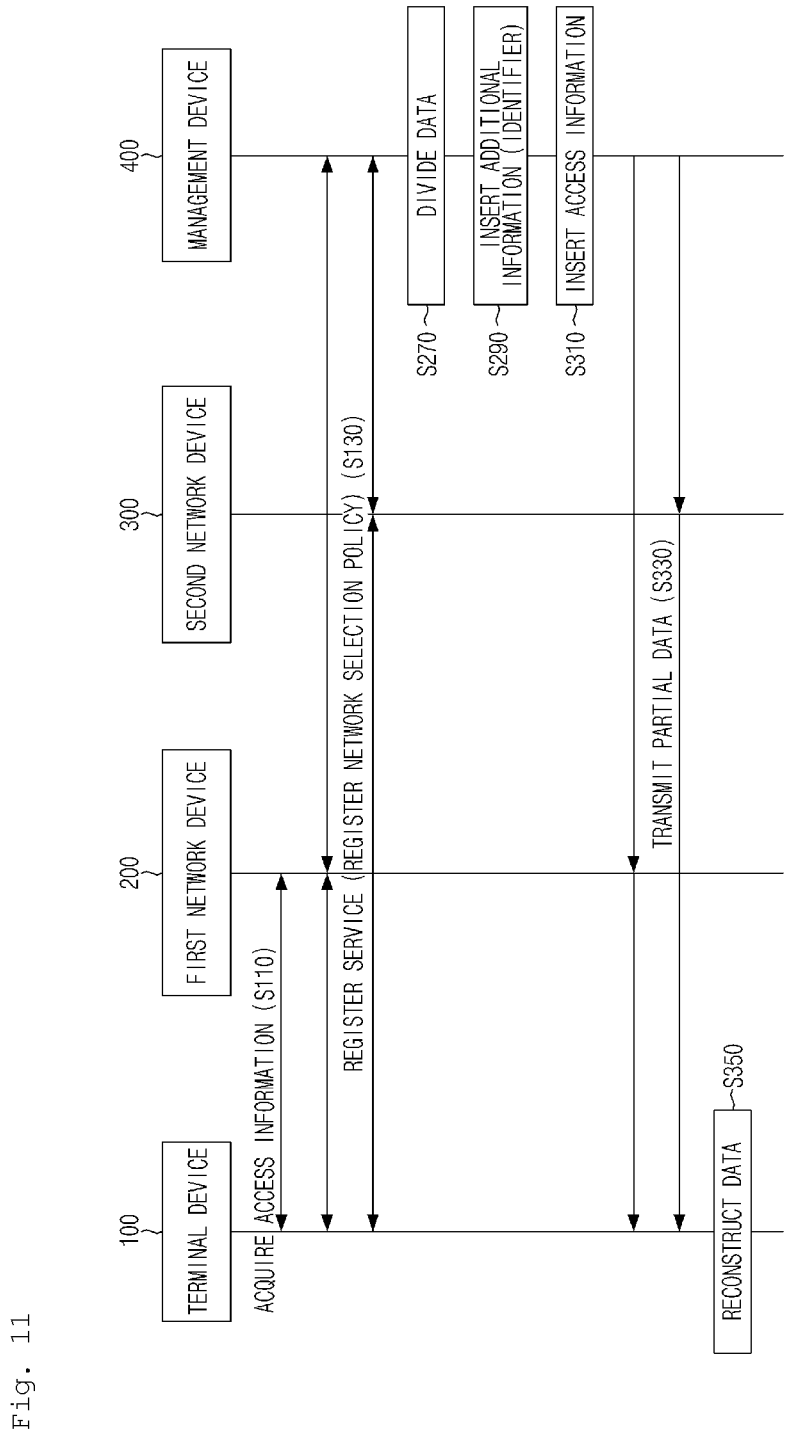
FIG. 11 is a flowchart of a downlink operation method of a heterogeneous network based-simultaneous data transmission service system according to at least one embodiment of the present disclosure.

Next, a downlink operation method of the heterogeneous network based-simultaneous data transmission service system according to at least one embodiment of the present disclosure will be described with reference to FIG. 11. Meanwhile, since the access information acquisition process and the service registration process between the terminal device 100 and the management device 400 are the same as the uplink operation described with reference to FIG. 6, detailed descriptions thereof will be omitted.

First, the management device 400 divides the data to be transmitted into partial data to use the simultaneous transmission service in step S270.

Preferably, the management device 400 divides the data to be transmitted into the partial data corresponding to the number of networks for the simultaneous data transmission using the heterogeneous network environment, that is, the 3G network and the WiFi network, and the division process may be performed according to the network selection policy transmitted from the policy management device 600 or the traffic distribution rate for each network changed according to the real time network status monitoring.

In other words, the management device 400 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the management device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network and the like.

Then, the management device 400 inserts additional information into the selected first partial data and second partial data in step S290.

Preferably, the management device 400 inserts the identifiers into the divided first partial data and second partial data to allow the terminal device 100 having received the divided first partial data and second partial data through the 3G network and the WiFi network to identify that the first partial data and the second partial data are the partial data provided from management device 400.

Further, the management device 400 inserts first order information for identifying orders of a plurality of partial data included in the first partial data into the first partial data and further inserts second order information for identifying orders of a plurality of partial data included in the second partial data into the second partial data to allow the terminal device 100 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the terminal device 100 having received the first partial data and the second partial data.

Next, the management device 400 inserts access information for transmitting the divided first partial data and second partial data in step S310.

Preferably, the management device 400 inserts access information for the access to the 3G network, that is, access information of the first network device 200, and access information of the management device 400 allocated during the service registration process to configure the header of the first partial data, so that the first partial data can be transmitted to the terminal device 100 via the first network device 200.

Further, the management device 400 inserts access information for the access to the WiFi network, that is, access information of the second network device 300, and access information of the terminal device 100 allocated during the service registration process to configure the header of the second partial data, so that the second partial data can be transmitted to the management device 400 via the second network device 300.

Then, the management device 400 transmits the first partial data and the second partial data to the terminal device 100 through the 3G network and the WiFi network based on the access information inserted into the headers in step S330.

Preferably, after inserting the additional information and the access information of the divided first partial data and second partial data, the management device 400 drives a communication module mounted to access the 3G network based on the corresponding access information to transmit the first partial data to the first network device 200 and drives a separate communication module mounted to access the WiFi network to transmit the second partial data to the second network device 300 at the same time.

Thereafter, the terminal device 100 reconstructs the data by combining the received first partial data and second partial data in step S350.

Preferably, the terminal device 100 identifies that the first partial data and the second partial data are the partial data provided from the management device 400 by using the identifiers included in the first partial data and the second partial data and identifies orders of the partial data by using first order information included in the first partial data and second order information included in the second partial data at the same time to mix (or rearrange) the partial data included in the first partial data and the second partial data based on the identified orders and combine the mixed (or rearranged) first partial data and second partial data, thereby reconstructing the data to be transmitted which is transmitted from the management device 400.

Figure 12:
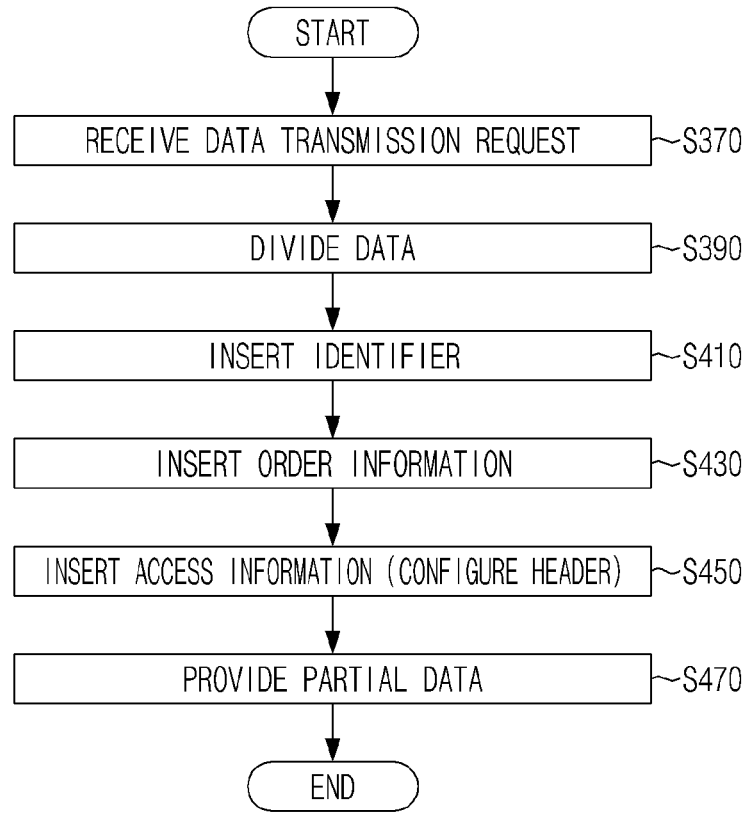
FIG. 12 is a flowchart of operations of a transmission device (terminal device) according to at least one embodiment of the present disclosure.

Hereinafter, an uplink operation of the terminal device 100 according to at least one embodiment of the present disclosure will be described with reference to FIG. 12.

First, according to a request of a particular application installed in the terminal device 100 through the mounting or download, the data to be transmitted is divided into partial data to use the simultaneous transmission service in steps S370 to S390.

Preferably, after the service registration through the acquisition of the access information for the access to the 3G network and the access to the WiFi network, the controller 110 divides the data to be transmitted into partial data corresponding to the number of networks for the simultaneous data transmission using a heterogeneous network environment, that is, the 3G network and the WiFi network, and the division process may be performed according to the network selection policy transmitted from the policy management device 600 or the changed traffic distribution rate for each network received from the management device 400 according to the real time network status monitoring.

In other words, the controller 110 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 110 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, 100% of the 3G network and 0% of the WiFi network and the like.

Then, the controller 110 inserts additional information into the selected first partial data and second partial data in steps S410 to S430.

That is, the controller 110 inserts identifiers into the divided first partial data and second partial data to allow the management device 400 having received the divided first partial data and second partial data through the 3G network and the WiFi network to identify that the first partial data and the second partial data are the partial data provided from the terminal device 100.

Further, the controller 110 inserts first order information for identifying orders of a plurality of partial data included in the first partial data into the first partial data and further inserts second order information for identifying orders of partial data included in the second partial data into the second partial data to allow the management device 400 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the management device 400 having received the first partial data and the second partial data.

Then, the controller 110 inserts access information for transmitting the divided first partial data and second partial data in step S450.

Preferably, the controller 110 inserts access information for the access to the 3G network, that is, access information of the first network device 200, access information of the management device 400, and access information of the external device 500 allocated during the service registration process to configure a header of the first partial data, so that the first partial data can be transmitted to the management device 400 via the first network device 200 and the data reconstructed through the management device 400 is additionally transmitted to the external device 500.

Further, the controller 110 inserts access information for the access to the WiFi network, that is, access information of the second network device 300, access information of the management device 400, and access information of the external device 500 allocated during the service registration process to configure a header of the second partial data, so that the second partial data can be transmitted to the management device 400 via the second network device 300 and the data reconstructed through the management device 400 is finally transmitted to the external device 500.

Thereafter, the controller 110 provides the first partial data and the second partial data to the first communication unit 120 and the second communication unit 130 to transmit the first partial data and the second partial data to the management device 400 through the 3G network and the WiFi network based on the access information inserted into the headers in step S470.

That is, after inserting the additional information and the access information of the divided first partial data and second partial data, the controller 110 provides the corresponding access information to the first communication unit 120 and the second communication unit 130 and drives the first communication 120 mounted to access the 3G network to transmit the first partial data to the first network device 200 and drives the second communication unit 130 mounted to access the WiFi network to transmit the second partial data to the second network device 300 at the same time.

Figure 13:
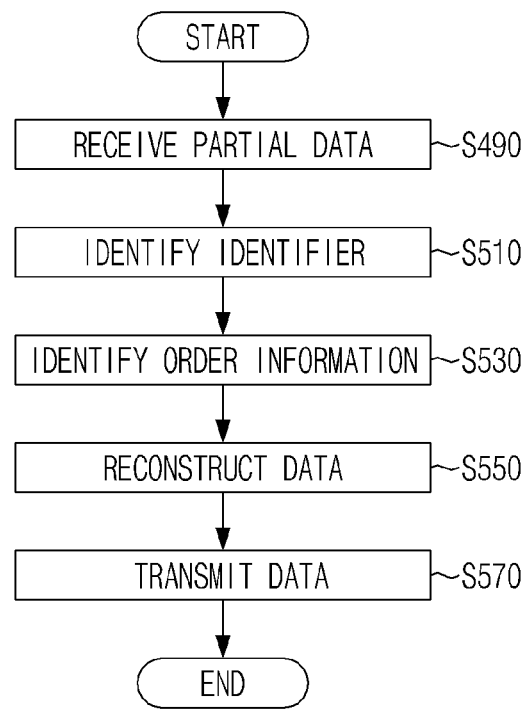
FIG. 13 is a flowchart of operations of a reception device (management device) according to at least one embodiment of the present disclosure.

Hereinafter, a downlink operation of the terminal device 100 according to at least one embodiment of the present disclosure will be described with reference to FIG. 13.

First, the first partial data and second partial data transmitted from the management device 400 are received in step S490.

Preferably, through a communication route formed according to the access information inserted into the first partial data and the second partial data, the controller 110 simultaneously receives the first partial data transmitted via the first network device 200 located in the 3G network through the first communication unit 120 and the second partial data transmitted via the second network device 300 located in the WiFi network through the second communication unit 130.

Then, the controller 110 reconstructs the data by combining the received first partial data and second partial data in steps S510 to S550.

Preferably, the controller 110 identifies that the first partial data and the second partial data are the partial data provided from the management device 400 by using the identifiers included in the first partial data and the second partial data and identifies orders of the partial data by using first order information included in the first partial data and second order information included in the second partial data at the same time.

Further, the controller 110 mixes (or rearranges) the partial data included in the first partial data and the second partial data based on the identified orders and combines the mixed (or rearranged) first partial data and second partial data to reconstruct the data to be transmitted which is transmitted from the management device 400.

Thereafter, the reconstructed data is transmitted in step S570.

Preferably, the controller 110 transmits the reconstructed data to the particular application executed in the terminal device.

Hereinafter, a downlink operation of the management device 400 according to at least one embodiment of the present disclosure will be described with reference to FIG. 12.

First, according to a request of the external device 500, the data to be transmitted is divided into partial data to user the simultaneous transmission service in steps S370 to S390.

Preferably, after the service registration through the acquisition of the access information for the access to the 3G network and the access to the WiFi network, the controller 430 divides the data to be transmitted into partial data corresponding to the number of networks for the simultaneous data transmission using a heterogeneous network environment, that is, the 3G network and the WiFi network, and the division process may be performed according to the network selection policy transmitted from the policy management device 600 or the traffic distribution rate for each network changed according to the real time network status monitoring.

In other words, the controller 430 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 430 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, 100% of the 3G network and 0% of the WiFi network and the like.

Then, additional information is inserted into the selected first partial data and second partial data in steps S410 to S430.

That is, the controller 430 inserts identifiers into the divided first partial data and second partial data to allow the terminal device 100 having received the divided first partial data and second partial data through the 3G network and the WiFi network to identify that the first partial data and the second partial data are the partial data provided from the management device 400.

Further, the controller 430 inserts first order information for identifying orders of a plurality of partial data included in the first partial data into the first partial data and further inserts second order information for identifying orders of partial data included in the second partial data into the second partial data to allow the terminal device 100 having received the first partial data and the second partial data to reconstruct the data by combining the partial data included in the first partial data and the partial data included in the second partial data based on the first order information and the second order information.

Here, as described above, the first order information and the second order information inserted into the first partial data and the second partial data may be used for identifying the current status for each network through the identification of the throughput of the transmitted data for the predetermined time by the terminal device 100 having received the first partial data and the second partial data.

Then, access information for transmitting the divided first partial data and second partial data is inserted in step S450.

Preferably, the controller 430 inserts access information for the access to the 3G network, that is, access information of the first network device 200, access information of the management device 400, and access information of the external device 500 allocated during the service registration process to configure a header of the first partial data, so that the first partial data can be transmitted to the terminal device 100 via the first network device 200.

Further, the controller 430 inserts access information for the access to the WiFi network, that is, access information of the second network device 300, access information of the management device 400, and access information of the external device 500 allocated during the service registration process to configure a header of the second partial data, so that the second partial data can be transmitted to the terminal device 100 via the second network device 300.

Thereafter, the controller 430 provides the first partial data and the second partial data to the first communication unit 120 and the second communication unit 130 to transmit the first partial data and the second partial data to the terminal device 100 through the 3G network and the WiFi network based on the access information inserted into the headers in step S470.

That is, after inserting the additional information and the access information of the divided first partial data and second partial data, the controller 430 provides the corresponding access information to the first communication unit 410 and the second communication unit 4200 and drives the first communication 410 mounted to access the 3G network to transmit the first partial data to the first network device 200 and drives the second communication unit 420 mounted to access the WiFi network to transmit the second partial data to the second network device 300 at the same time.

Hereinafter, an uplink operation of the management device 400 according to at least one embodiment of the present disclosure will be described with reference to FIG. 13.

First, the first partial data and the second partial data are received from the terminal device 100 in step S490.

Preferably, through a communication route formed according to the access information inserted into the first partial data and the second partial data, the controller 430 simultaneously receives the first partial data transmitted via the first network device 200 located in the 3G network through the first communication unit 410 and the second partial data transmitted via the second network device 300 located in the WiFi network through the second communication unit 420.

Then, the controller 430 reconstructs the data by combining the received first partial data and second partial data in steps S510 to S550.

Preferably, the controller 430 identifies that the first partial data and the second partial data are the partial data provided from the management device 400 by using the identifiers included in the first partial data and the second partial data and identifies orders of the partial data by using first order information included in the first partial data and second order information included in the second partial data at the same time.

Further, the controller 430 mixes (or rearranges) the partial data included in the first partial data and the second partial data based on the identified orders and combines the mixed (or rearranged) first partial data and second partial data to reconstruct the data to be transmitted which is transmitted from the management device 400.

Thereafter, the reconstructed data is transmitted to the external device 500 in step S570.

Preferably, the controller 430 identifies the access information of the external device 500 inserted into the first partial data and the second partial data to transmit the reconstructed data to be transmitted to the external device 500. At this time, as the external device 500 is located in an external network, the management device 400 performs a Network Address Translation (NAT) function to switch the access information of the external device 500 inserted into the first partial data and the second partial data to its own address information and thus access the external device 500.

As described above, according to the heterogeneous network based-simultaneous data transmission service method according to the present disclosure, a data transmission rate for each access network is determined in the heterogeneous network environment, data to be transmitted is divided according to the determined data transmission rate, and the divided data is simultaneously transmitted through heterogeneous networks, and a receiver side receives and combines the divided data so as to reconstruct the data to be transmitted by.

Accordingly, a data transmission speed increases by transmitting partial data divided from the data to be transmitted, and data service quality is improved and network stability is secured by effectively changing data traffic of entire networks.

Figure 14:
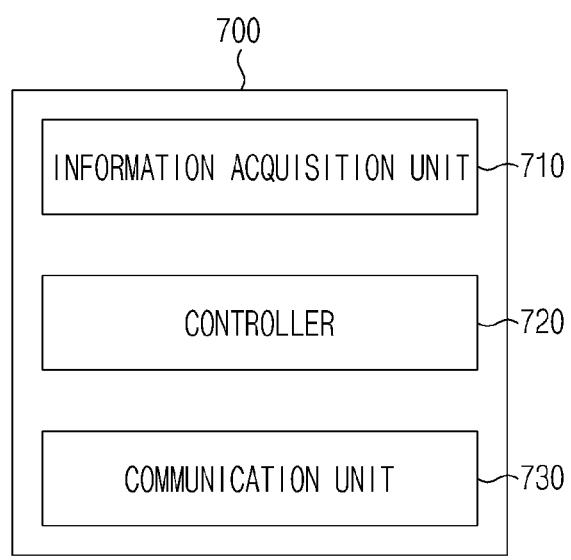
FIG. 14 is a schematic block diagram of a terminal device according to at least one embodiment of the present disclosure.

Hereinafter, the terminal device 700 according to at least another embodiment of the present disclosure will be described with reference to FIG. 14 in more detail.

That is, the terminal device 700 includes an information acquisition unit 710 configured to acquire the network selection policy corresponding to the current location, a controller 720 configured to select partial data divided from the data to be transmitted, and a communication unit 730 is configured to access the second network device 300 to transmit the partial data. Here, the information acquisition unit 710 and the controller 720 may be mounted to an OS kernel installed in the terminal device 700, and perform a series of operations for a simultaneous data transmission service according to a request of a particular application installed in the terminal device 700 through the mounting or download. Further, the communication unit 730 refers to a communication module for interworking with the first network device 200 by using the 3G network and interworking with the second network device 300 by using the WiFi network.

The information acquisition unit 710 is configured to acquire the network selection policy corresponding to the current location from the policy management device 600.

That is, in order to select the particular second network device 300 from a plurality of second network devices 300 for operating the accessible WiFi network in the current location, that is, the wireless local area network to access the selected particular second network device 300, the information acquisition unit 710 acquires the network selection policy from the policy management device 600.

At this time, the information acquisition unit 710 transmits a policy request including location information to the policy management device 600 for managing status information for each second network device 300, for example, the number of accessed terminal devices and a traffic status to acquire the network selection policy including information on the available optimal second network device 300 selected based on the status information among the plurality of second network devices 300 corresponding to the current location of the terminal device 700, that is, information on the network device to be accessed from the policy management device 600.

Further, the information acquisition unit 710 transmits the policy request including a list of the detected second network devices 300 in the current location to acquire the network selection policy including the information on the available optimal second network device 300 selected based on the status information, that is, the information on the network device to be accessed corresponding to a part of the list of the detected second network devices 300 in the current location of the terminal device 700 from the policy management device 600.

Furthermore, in connection with an operation of transmitting the policy request including the list of the detected second network devices 300 in the current location, the information acquisition unit 710 can acquire the network selection policy including information on the network device to be accessed of which an access priority is set in accordance with the list of the detected networks from the policy management device 600.

The controller 720 is configured to select partial data divided from the data to be transmitted to use the simultaneous transmission service.

That is, the controller 720 divides the data to be transmitted into partial data corresponding to the number of networks for the simultaneous data transmission using a heterogeneous network environment, that is, the 3G network and the WiFi network, and the division process may be performed according to the network selection policy transmitted from the policy management device 600.

In other words, the controller 720 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 720 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

The communication unit 730 is configured to access the particular second network device 200 to transmit the partial data based on the network selection policy.

That is, the communication unit 730 selects the particular second network device 300 from a plurality of second network devices 300 for operating the WiFi network accessible in the current location, that is, the wireless local area network based on information on the network device to be accessed included in the network selection policy and accesses the selected particular second network device 300 to transmit the second partial data.

Accordingly, the communication unit 730 transmits the first partial data to the first network device 200 located in the 3G network, and the first network device 200 transmits the first partial data to the management device 400 corresponding to the reception device. Further, the communication unit 730 transmits the second partial data to the selected particular second network device 300 based on the information on the network device to be accessed, and the second network device 300 transmits the second partial data to the management device 400 corresponding to the reception device.

Figure 15:
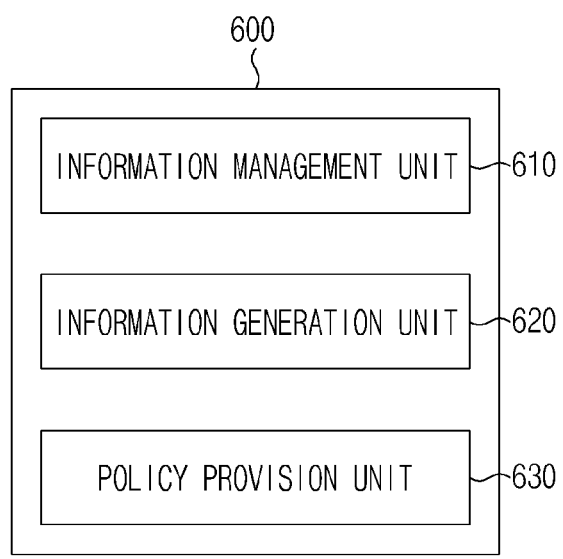
FIG. 15 is a schematic block diagram of a policy management device according to at least one embodiment of the present disclosure.

Hereinafter, a more detailed configuration of the policy management device 600 according to at least one embodiment of the present disclosure will be described with reference to FIG. 15.

That is, the policy management device 600 includes an information management unit 610 configured to acquire status information for each network device, an information generation unit 620 configured to generate information on the network device to be accessed, and a policy provision unit 630 configured to provide the network selection policy including the generated information on the network device to be accessed to the terminal device 700.

The information management unit 610 is configured to acquire the status information for each network device.

That is, the information management unit 610 collects the status information transmitted from the second network device 300 on a set period or in real time, for example, the number of accessed terminal devices and the traffic status to manage the collected status information for each second network device 300.

Further, in addition to the status information for each second network device 300, the information management unit 610 collects network status information received from the terminal device 700 and the management device 400 according to various network parameters on the heterogeneous networks including, for example, a subscriber preference, a subscriber type, a subscription payment system, an application type to be serviced and the like, and a network status change.

The information generation unit 620 is configured to generate information on the network device to be accessed based on the acquired status information in accordance with the current location of the terminal device 700.

That is, when the policy request including location information is received from the terminal device 700, the information generation unit 620 can select the available optimal second network device 300 selected from a plurality of the second network devices 300 corresponding to the current location of the terminal device 700 based on the status information and generate the information on the network device to be accessed.

Further, the information generation unit 620 receives the policy request including the list of the detected second network devices 300 in the current location of the terminal device 700 from the terminal device 700 to generate information on the available optimal second network device 300 selected based on the status information, that is, the information on the network device to be accessed corresponding to a part of the list of the detected second network devices 300 in the current location of the terminal device 700.

In addition, in connection with the policy request including the list of the detected second network devices 300 in the current location received from the terminal device 700, the information generation unit 620 sets an access priority corresponding to the list of the detected network devices based on the status information to generate the information on the network device to be accessed.

The policy provision unit 630 is configured to provide the network selection policy including the generated information on the network device to be accessed to the terminal device 700 to induce the terminal device 700 to access the particular second network device 300.

That is, the policy provision unit 630 induces the terminal device 700 to select the particular second network device 300 from a plurality of second network devices 300 for operating the accessible WiFi network in the current location, that is, the wireless local area network and access the selected particular second network device 300 by providing the network selection policy including the generated information on the network device to be accessed to the terminal device 700.

Meanwhile, in addition to the information on the network device to be accessed, the policy provision unit 630 determines a network selection policy including relative usage rates between networks to divide the data to be transmitted into partial data corresponding to the number of networks for the simultaneous data transmission using the heterogeneous network environment, that is, the 3G network and the WiFi network based on the network status information received from the terminal device 700 and the management device 400 according to various network parameters on the heterogeneous networks including, for example, a subscriber preference, a subscriber type, a subscription payment system, an application type to be serviced and the like, and a network status change.

As described above, according to the heterogeneous network based-simultaneous data transmission service system according to the present disclosure, at the time of dividing data to be transmitted and simultaneously transmitting the divided data according to a network selection policy in the heterogeneous network environment, information on an accessible network device corresponding to a current location of the terminal device is generated based on status information on one or more network devices supporting data transmission/reception using a particular network and an access of the terminal device is induced through provision of the network selection policy including the generated information, so as to efficiently control an access to an optimal network device in the current location of the terminal device to achieve an efficient and highly reliable heterogeneous network based-simultaneous data transmission service and further increase a data transmission speed through divided data transmission.

Figure 16:
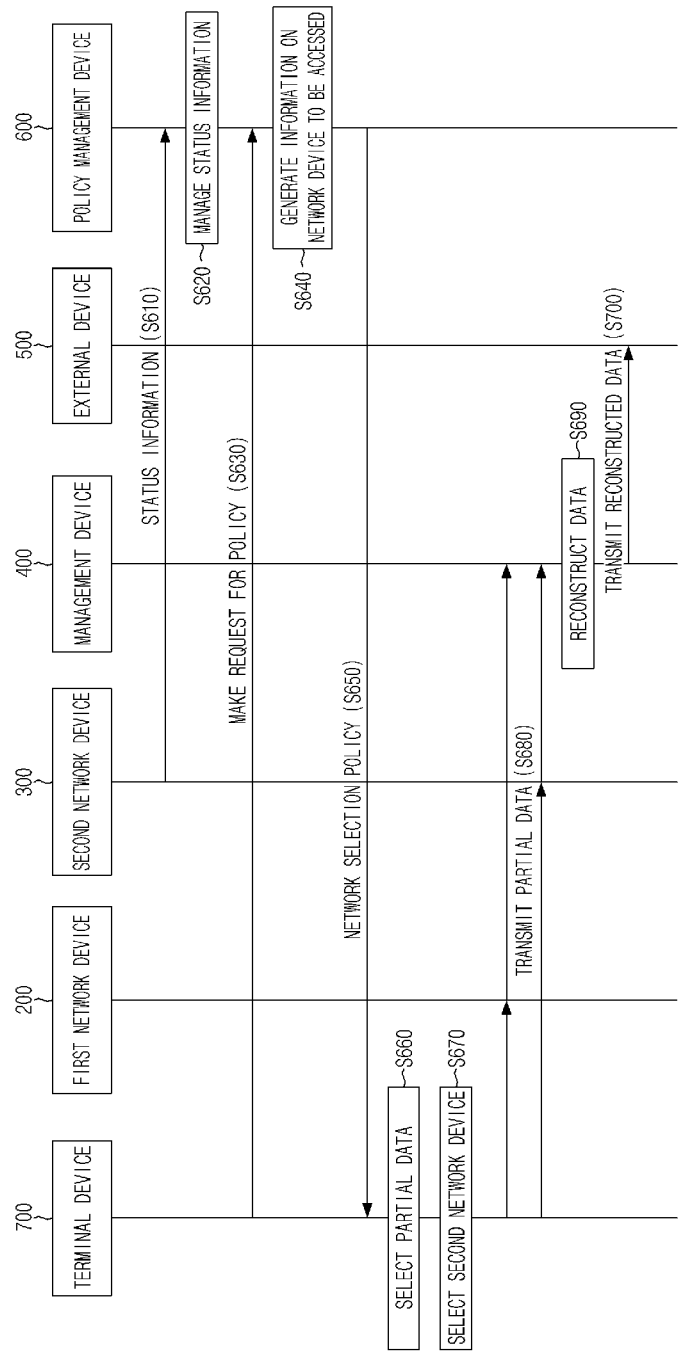
FIG. 16 is a flowchart of an uplink operation method of a heterogeneous network based-simultaneous data transmission service system according to at least one embodiment of the present disclosure.
Figure 17:
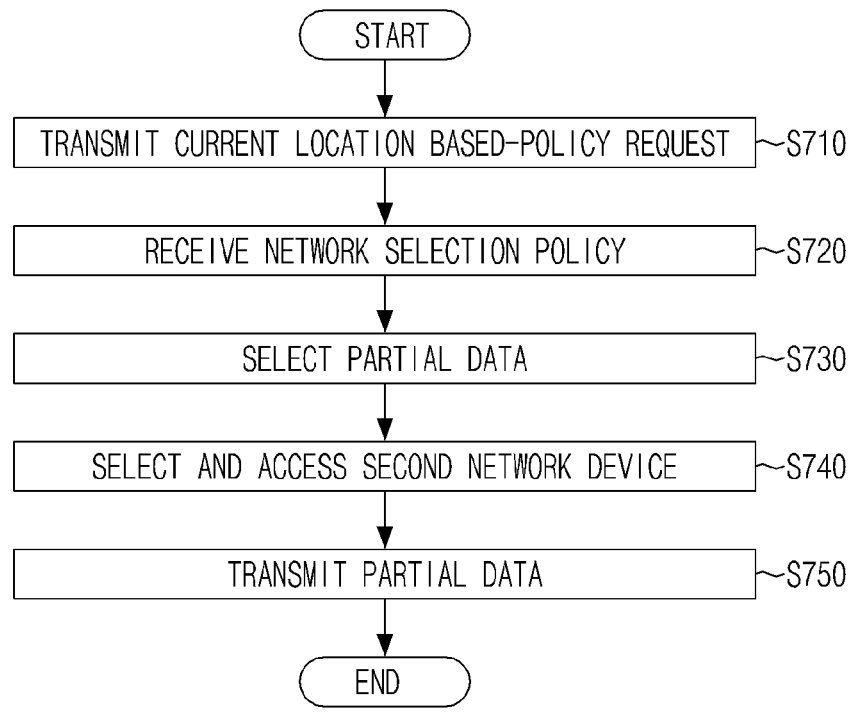
FIG. 17 is a flowchart of an operation of a transmission device (terminal device) according to at least one embodiment of the present disclosure.

Hereinafter, a heterogeneous network based-simultaneous data transmission service method according to at least one embodiment of the present disclosure will be described with reference to FIGS. 16 to 17. Here, configurations the same as those illustrated in FIGS. 1 and 14 to 15 will be described by using the corresponding reference numerals for convenience of the description.

First, an operation method of the heterogeneous network based-simultaneous data transmission service system according to at least one embodiment of the present disclosure will be described with reference to FIG. 16.

First, the policy management device 600 acquires status information for each network device in steps S610 to S620.

Preferably, the policy management device 600 collects the status information transmitted from the second network device 300 on a set period or in real time, for example, the number of accessed terminal devices and the traffic status to manage the collected status information for each second network device 300.

Further, in addition to the status information for each second network device 300, the policy management device 600 collects network status information received from the terminal device 700 and the management device 400 according to various network parameters on the heterogeneous networks including, for example, a subscriber preference, a subscriber type, a subscription payment system, an application type to be serviced and the like, and a network status change.

Then, the terminal device 700 makes a request for the network selection policy corresponding to the current location to the policy management device 600 in step 630.

That is, the terminal device 700 acquires the network selection policy from the policy management device 600 in order to select the particular second network device 300 from a plurality of second network devices 300 for operation the accessible WiFi network in the current location, that is, the wireless local area network to access the selected particular second network device 300.

Then, the policy management device 600 generates information on the network device to be accessed based on the acquired status information in accordance with the current location of the terminal device 700 in steps S630 to S640.

Preferably, when the policy request including location information is received from the terminal device 700, the policy management device 600 can select the available optimal second network device 300 selected from a plurality of the second network devices 300 corresponding to the current location of the terminal device 700 based on the status information and generate the information on the network device to be accessed.

Further, the policy management device 600 receives the policy request including the list of the detected second network devices 300 in the current location of the terminal device 700 from the terminal device 700 to generate information on the available optimal second network device 300 selected based on the status information, that is, the information on the network device to be accessed corresponding to a part of the list of the detected second network devices 300 in the current location of the terminal device 700.

In addition, in connection with the policy request including the list of the detected second network devices 300 in the current location received from the terminal device 700, the policy management device 600 sets an access priority corresponding to the list of the detected network devices based on the status information to generate the information on the network device to be accessed.

Further, the policy management device 600 provides the network selection policy including the generated information on the network device to be accessed to the terminal device 700 to induce the terminal device 700 to access the particular second network device 300 in step S650.

Preferably, the policy management device 600 induces the terminal device 700 to select the particular second network device 300 from a plurality of second network devices 300 for operating the accessible WiFi network in the current location, that is, the wireless local area network and access the selected particular second network device 300 by providing the network selection policy including the generated information on the network device to be accessed to the terminal device 700.

Meanwhile, the policy management device 600 determines a network selection policy including relative usage rates between networks to divide the data to be transmitted into partial data corresponding to the number of networks for the simultaneous data transmission using the heterogeneous network environment, that is, the 3G network and the WiFi network based on the network status information received from the terminal device 700 and the management device 400 according to various network parameters on the heterogeneous networks including, for example, a subscriber preference, a subscriber type, a subscription payment system, an application type to be serviced and the like, and a network status change.

Next, the terminal device 700 is configured to select partial data divided from the data to be transmitted to use the simultaneous transmission service in step S660.

Preferably, the terminal device 700 divides the data to be transmitted into partial data corresponding to the number of networks for the simultaneous data transmission using the heterogeneous network environment, that is, the 3G network and the WiFi network, and the division process may be performed according to the network selection policy transmitted from the policy management device 600.

In other words, the terminal device 700 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the terminal device 700 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Then, the terminal device 700 accesses the particular second network device 200 based on the network selection policy to transmit the partial data in steps S670 to S680.

Preferably, the terminal device 700 selects the particular second network device 300 from a plurality of second network devices 300 for operating the WiFi network accessible in the current location, that is, the wireless local area network based on information on the network device to be accessed included in the network selection policy and accesses the selected particular second network device 300 to transmit the second partial data.

Accordingly, the terminal device 700 transmits the first partial data to the first network device 200 located in the 3G network, and the first network device 200 transmits the first partial data to the management device 400 corresponding to the reception device. Further, the terminal device 700 transmits the second partial data to the selected particular second network device 300 based on the information on the network device to be accessed, and the second network device 300 transmits the second partial data to the management device 400 corresponding to the reception device.

The management device 400 receives the first partial data from the first network device 200 and the second partial data from the second network device 300 and reconstructs the data to be transmitted which the terminal device 700 desires to transmit by combining the first partial data and the second partial data based on virtual network access information included in the received first partial data and second partial data to reconstitute (or generate) the data in step S690.

Preferably, the management device 400 can reconstitute (or generate) the original data to be transmitted by recognizing the first partial data and the second partial data having the same virtual network access information based on the virtual network access information included in received several partial data and mixing (or rearranging) and combining the first partial data and the second partial data according to order information included in the corresponding partial data.

Thereafter, the management device 400 transmits the reconstructed data to be transmitted to the external device 500 by using access information of the external device corresponding to a final destination recognized through at least one partial data of the first partial data and the second partial data in step S700.

As described above, during the process in which the first partial data and the second partial data divided by the terminal device 700 pass through the management device 400 through the heterogeneous networks, the first partial data and the second partial data are combined by the management device 400 to be reconstructed as the original data to be transmitted, and then the reconstructed data to be transmitted is transmitted to the external device 500 corresponding to the final destination as one data.

Hereinafter, an operation method of the terminal device 700 according to at least another embodiment of the present disclosure will be described with reference to FIG. 17.

First, the network selection policy corresponding to the current location is acquired from the policy management device 600 in steps S710 to S720.

Preferably, in order to select the particular second network device 300 from a plurality of second network devices 300 for operating the accessible WiFi network in the current location, that is, the wireless local area network to access the selected particular second network device 300, the information acquisition unit 710 acquires the network selection policy from the policy management device 600.

At this time, the information acquisition unit 710 transmits a policy request including location information to the policy management device 600 for managing status information for each second network device 300, for example, the number of accessed terminal devices and a traffic status to acquire the network selection policy including information on the available optimal second network device 300 selected based on the status information among the plurality of second network devices 300 corresponding to the current location of the terminal device 700, that is, information on the network device to be accessed from the policy management device 600.

Further, the information acquisition unit 710 transmits the policy request including a list of the detected second network devices 300 in the current location to acquire the network selection policy including the information on the available optimal second network device 300 selected based on the status information, that is, the information on the network device to be accessed corresponding to a part of the list of the detected second network devices 300 in the current location of the terminal device 700 from the policy management device 600.

Furthermore, in connection with an operation of transmitting the policy request including the list of the detected second network devices 300 in the current location, the information acquisition unit 710 can acquire the network selection policy including information on the network device to be accessed of which an access priority is set in accordance with the list of the detected networks from the policy management device 600.

Then, partial data divided from the data to be transmitted is selected to use the simultaneous transmission service in step S730.

Preferably, the controller 720 divides the data to be transmitted into partial data corresponding to the number of networks for the simultaneous data transmission using a heterogeneous network environment, that is, the 3G network and the WiFi network, and the division process may be performed according to the network selection policy transmitted from the policy management device 600.

In other words, the controller 720 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 720 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Thereafter, the partial data is transmitted through the access to the particular second network device 200 based on the network selection policy in steps S740 to S750.

Preferably, the communication unit 730 selects the particular second network device 300 from a plurality of second network devices 300 for operating the WiFi network accessible in the current location, that is, the wireless local area network based on information on the network device to be accessed included in the network selection policy and accesses the selected particular second network device 300 to transmit the second partial data.

Accordingly, the communication unit 730 transmits the first partial data to the first network device 200 located in the 3G network, and the first network device 200 transmits the first partial data to the management device 400 corresponding to the reception device. Further, the communication unit 730 transmits the second partial data to the selected particular second network device 300 based on the information on the network device to be accessed, and the second network device 300 transmits the second partial data to the management device 400 corresponding to the reception device.

Figure 18:
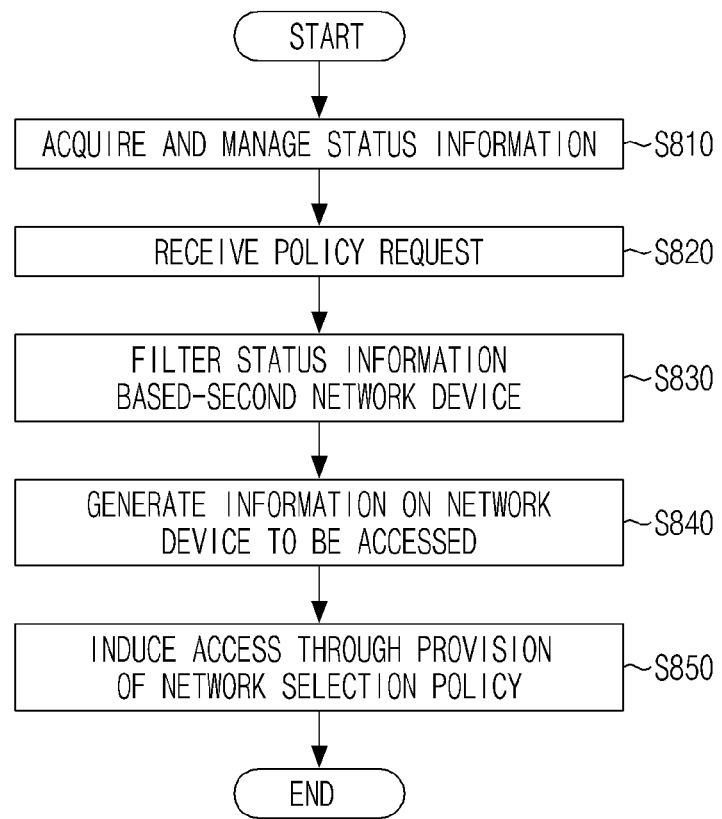
FIG. 18 is a flowchart of an operation of a policy management device according to at least one embodiment of the present disclosure.

Hereinafter, an operation method of the policy management device 600 according to at least one embodiment of the present disclosure will be described with reference to FIG. 18.

First, status information for each network is acquired in step S810.

Preferably, the information management unit 610 collects the status information transmitted from the second network device 300 on a set period or in real time, for example, the number of accessed terminal devices and the traffic status to manage the collected status information for each second network device 300.

Meanwhile, in addition to the status information for each second network device 300, the information management unit 610 collects network status information received from the terminal device 700 and the management device 400 according to various network parameters on the heterogeneous networks including, for example, a subscriber preference, a subscriber type, a subscription payment system, an application type to be serviced and the like, and a network status change.

Then, information on the network device to be accessed is generated based on the acquired status information in accordance with the current location of the terminal device 700 in step S840.

Preferably, when the policy request including location information is received from the terminal device 700, the information generation unit 620 can select the available optimal second network device 300 selected based on the status information from a plurality of the second network devices 300 corresponding to the current location of the terminal device 700 and generate the information on the network device to be accessed.

Further, the information generation unit 620 receives the policy request including the list of the detected second network devices 300 in the current location of the terminal device 700 from the terminal device 700 to generate information on the available optimal second network device 300 selected based on the status information, that is, the information on the network device to be accessed corresponding to a part of the list of the detected second network devices 300 in the current location of the terminal device 700.

In addition, in connection with the policy request including the list of the detected second network devices 300 in the current location received from the terminal device 700, the information generation unit 620 sets an access priority corresponding to the list of the detected network devices based on the status information to generate the information on the network device to be accessed.

Thereafter, the access to the particular second network device is induced through the provision of the network selection policy including the generated information on the network device to be accessed to the terminal device 700 in step S850.

Preferably, the policy provision unit 630 induces the terminal device 700 to select the particular second network device 300 from a plurality of second network devices 300 for operating the accessible WiFi network in the current location, that is, the wireless local area network and access the selected particular second network device 300 by providing the network selection policy including the generated information on the network device to be accessed to the terminal device 700.

Meanwhile, the policy provision unit 630 determines a network selection policy including relative usage rates between networks to divide the data to be transmitted into partial data corresponding to the number of networks for the simultaneous data transmission using the heterogeneous network environment, that is, the 3G network and the WiFi network based on the network status information received from the terminal device 700 and the management device 400 according to various network parameters on the heterogeneous networks including, for example, a subscriber preference, a subscriber type, a subscription payment system, an application type to be serviced and the like, and a network status change.

As described above, according to the heterogeneous network based-simultaneous data transmission service method according to the present disclosure, at the time of dividing data to be transmitted according to a network selection policy and simultaneously transmitting the divided data in the heterogeneous network environment, information on an accessible network device corresponding to a current device of the terminal device is generated based on status information on one or more network devices supporting data transmission/reception using a particular network and an access of the terminal device is induced through provision of the network selection policy including the generated information, so as to efficiently control an access to an optimal network device in the current location of the terminal device to achieve an efficient and highly reliable heterogeneous network based-simultaneous data transmission service and further increase a data transmission speed through divided data transmission.

According to the heterogeneous network based-simultaneous data transmission service system, device and method according to the present disclosure, a data transmission rate for each access network is determined in a heterogeneous network environment, data to be transmitted is divided according to the determined data transmission rate, and the divided data is simultaneously transmitted through different networks, and a receiver side receives and combines the divided data so as to reconstruct the data to be transmitted. As the data to be transmitted is divided and the divided partial data is transmitted, a data transmission speed increases, and data service quality is improved and network stability is secured through an effective change in data traffic of entire networks.

Meanwhile, the methods or steps of the algorithm described related to some embodiments of the present disclosure may be directly realized in the form of hardware, software executed by a processor, or a combination thereof. The software module may reside in a storage medium, such as a RAM memory, a flash memory, a ROM memory, an EPROM memory, an EEPROM memory, registers, a hard disc, a mobile disc, a CD-ROM, or other storage devices. The storage medium is connected to the processor, so that the processor may read information from the storage medium or record the information onto the storage medium. Alternatively, the storage medium can be integrated in the processor. The processor and the storage medium may be included in an application specific integrated circuits (ASIC). The ASIC may be included in one or more of the terminal device, the first and second network devices, the policy management device, the management device, the external device and other hardware elements in the heterogeneous network(s). Alternatively, the processor and the storage medium may serve as components of one or more of the terminal device, the first and second network devices, the policy management device, the management device, the external device and other hardware elements in the heterogeneous network(s).

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While the present disclosure has been shown and described with reference to certain embodiments thereof, it will be understood by those skilled in the art that various changes in form and details may be made therein without departing from the subject matter, the spirit and scope of the present disclosure. Specific terms used in this disclosure and drawings are used for illustrative purposes and not to be considered as limitations of the present disclosure.

What is claimed is:

1. A transmission device, comprising:
 a controller configured to divide data into two or more partial data;
 a first communication unit configured to transmit first partial data corresponding to a part of the divided two or more partial data over a first network; and
 a second communication unit configured to transmit second partial data corresponding to another part of the divided two or more partial data over a second network, the first and second networks being different networks of a heterogeneous network,
 wherein the controller is configured to
  select the first partial data from the divided two or more partial data according to a first transmission rate for data transmission to a first network device via the first communication unit,
  select the second partial data from the divided two or more partial data according to a second transmission rate for data transmission to a second network device via the second communication unit,
  determine whether at least one of the first transmission rate and the second transmission rate is changed, and
  when one or more of the first transmission rate and the second transmission rate are changed as a result of the determination,
  (i) select the first partial data from the divided two or more partial data according to the changed first transmission rate, or
  (ii) select the second partial data from the divided two or more partial data according to the changed second transmission rate, or
  (iii) select the first partial data from the divided two or more partial data according to the changed first transmission rate and select the second partial data from the divided two or more partial data according to the changed second transmission rate.

2. The transmission device of claim 1, wherein
 the first partial data includes at least one of:
  first order information for identifying orders of one or more partial data included in the first partial data;
  first access information including one or more of access information of the first network device; and
  access information of a reception device for receiving the first partial data transmitted via the first network device,
 the second partial data includes at least one of:
  second order information for identifying orders of one or more partial data included in the second partial data;
  second access information including one or more of access information of the second network device; and
  access information of the reception device for receiving the second partial data transmitted via the second network device, and
 the first order information and the second order information are configured for reconstituting the data through a combination of the first partial data and the second partial data.

3. The transmission device of claim 2, wherein the first access information and the second access information further include access information of an external device for receiving the reconstituted data transmitted from the reception device.

4. The transmission device of claim 2, wherein the controller is configured to simultaneously transmit the first partial data to the first network device through the first communication unit, and the second partial data to the second network device through the second communication unit, wherein the first network device and second network device are different network devices in a heterogeneous network environment.

5. The transmission device of claim 2, wherein
 the controller is configured to insert additional information into the first partial data and the second partial data respectively,
 the additional information includes at least one of (i) identifiers to identify that the first partial data and the second partial data are partial data provided from the transmission device, (ii) the first order information for identifying orders of one or more of partial data included in the first partial data and the second order information for identifying orders of one or more of partial data included in the second partial data, (iii) access information for the first network device, the second network device, the receiving device, and an external device to which the first partial data and the second partial data are to be transmitted.

6. A reception device, comprising:
 a first communication unit configured to receive first partial data selected from two or more partial data divided from data according to a first transmission rate for data transmission to a first network device;
 a second communication unit configured to receive second partial data selected from the two or more partial data according to a second transmission rate for data transmission to a second network device; and a controller configured to reconstitute the data by combining the received first partial data and the received second partial data, wherein the first communication unit is configured to receive the first partial data transmitted via the first network device by using access information of the first network device and access information of the reception device included in first access information included in the first partial data, and the second communication unit is configured to receive the second partial data transmitted via the second network device by using access information of the second network device and access information of the reception device included in second access information included in the second partial data.

7. A non-transitory computer-readable recording medium, comprising a command for executing a process comprising:

dividing data into two or more partial data;

selecting first partial data corresponding to a part of the divided two or more partial data and second partial data corresponding to another part of the divided two or more partial data; and providing the selected first partial data and the selected second partial data, wherein the command for executing the selecting selects the first partial data from the divided two or more partial data according to a first transmission rate for data transmission to a first network device and selects the second partial data from the divided two or more partial data according to a second transmission rate for data transmission to a second network device, the first and second network devices being different network devices of a heterogeneous network, wherein the command for executing the selecting determines whether at least one of the first transmission rate and the second transmission rate is changed, and when one or more of the first transmission rate and the second transmission rate are changed as a result of the determination, (i) selects the first partial data from the divided two or more partial data according to the changed first transmission rate, or (ii) selects the second partial data from the divided two or more partial data according to the changed second transmission rate, or (iii) selects the first partial data from the divided two or more partial data according to the changed first transmission rate and selects the second partial data from the divided two or more partial data according to the changed second transmission rate.

8. The non-transitory computer-readable recording medium of claim 7, wherein the selected first partial data includes at least one of:

first order information for identifying orders of one or more partial data included in the selected first partial data;

first access information including one or more of access information of the first network device; and access information of a particular reception device for receiving the selected first partial data transmitted via the first network device, the selected second partial data includes at least one of:

second order information for identifying orders of one or more partial data included in the selected second partial data;

second access information including one or more of access information of a second network device; and access information of a particular reception device for receiving the selected second partial data transmitted via the second network device, and wherein the first order information and the second order information are configured for reconstituting the data through a combination of the one or more partial data included in the selected first partial data and the one or more partial data included in the selected second partial data.

9. The non-transitory computer-readable recording medium of claim 8, wherein the first access information and the second access information further include access information of an external device for receiving the reconstituted data transmitted to the reception device.

10. A transmission device for a simultaneous data transmission service, comprising:

an information acquisition unit configured to acquire a network selection policy corresponding to a current location of the transmission device;

a controller configured to divide data into two or more partial data; and a communication unit configured to access at least one of network devices based on information on the network devices to be accessed included in the network selection policy, and transmit the divided two or more partial data through the at least one of the network devices, wherein the network selection policy is provided by a policy provision unit of a policy management device, and the network selection policy includes the information on the network devices to be accessed to the transmission device to allow the transmission device to transmit the two or more partial data divided from the data to be transmitted based on the information on the network devices to be accessed.

11. The transmission device of claim 10, wherein the information acquisition unit is configured to acquire the network selection policy including the information on the network devices to be accessed corresponding to the current location from the policy management device configured to manage status information for each network device as a response to transmission of the current location.

12. The transmission device of claim 10, wherein the information acquisition unit is configured to acquire the network selection policy including the information on the network device to be accessed corresponding to at least a part of a list of detected network devices from the policy management device configured to manage status information for each network device as a response to transmission of the list of the detected network devices by the transmission device in the current location.

13. A policy management device, comprising:

an information management unit configured to acquire status information for each network device;

an information generation unit configured to generate information on a network device to be accessed corresponding to a current location of a transmission device based on the status information; and a policy provision unit configured to provide a network selection policy including the information on the network device to be accessed to the transmission device to allow the transmission device to transmit two or more partial data divided from data to be transmitted based on the information on the network device to be accessed.

14. The policy management device of claim 13, wherein the information generation unit is configured to generate the information on the network device accessible by the transmission device from location information received from the transmission device based on the status information as the information on the network device to be accessed.

15. The policy management device of claim 13, wherein the information generation unit is configured to the information on the network device corresponding to a part of a list of detected network devices by the transmission device in the current location of the transmission device based on the status information as the information on the network device to be accessed.

16. A policy management device, comprising:
   an information management unit configured to acquire status information for each network device;
   an information generation unit configured to generate information on a network device to be accessed corresponding to a current location of a transmission device based on the status information; and
   a policy provision unit configured to provide a network selection policy including the information on the network device to be accessed to the transmission device to allow the transmission device to transmit two or more partial data divided from data to be transmitted based on the information on the network device to be accessed,
   wherein the status information includes one or more of a number of users accessed for each network device and a traffic status.

17. A method for providing a simultaneous data transmission service, the method comprising:
   acquiring, by a transmission device, a network selection policy corresponding to a current location of the transmission device;
   dividing, by the transmission device, data into two or more partial data;
   accessing, by the transmission device, at least one of network devices based on information on the network devices to be accessed included in the network selection policy; and
   transmitting, by the transmission device, the divided partial data through the at least one of the network devices.

18. A method for providing a simultaneous data transmission service, the method comprising:
   acquiring, by a transmission device, a network selection policy corresponding to a current location of the transmission device;
   dividing, by the transmission device, data into two or more partial data;
   accessing, by the transmission device, at least one of network devices based on information on the network devices to be accessed included in the network selection policy;
   transmitting, by the transmission device, the divided partial data through the at least one of the network devices;
   acquiring, by a policy management device, status information for each network device in a heterogeneous network;
   generating, by the policy management device, the information on the network devices to be accessed corresponding to the current location of the transmission device based on the status information; and
   providing, by the policy management device, the network selection policy to the transmission device.

19. The method of claim 18, wherein the status information includes at least one of a number of users accessed for each network device of the heterogeneous network and a traffic status.

* * * * *